US012699186B2

(12) United States Patent
Wagner et al.

(10) Patent No.: US 12,699,186 B2
(45) Date of Patent: Aug. 4, 2026

(54) INTERFEROMETRIC IMAGER AND METHOD

(71) Applicant: THE REGENTS OF THE UNIVERSITY OF COLORADO, A BODY CORPORATE, Denver, CO (US)

(72) Inventors: Kelvin Wagner, Boulder, CO (US); Kai-Ting Ting, Boulder, CO (US)

(73) Assignee: THE REGENTS OF THE UNIVERSITY OF COLORADO, A BODY CORPORATE, Denver, CO (US)

(*) Notice: Subject to any disclaimer, the term of this patent is extended or adjusted under 35 U.S.C. 154(b) by 1351 days.

(21) Appl. No.: 17/356,172

(22) Filed: Jun. 23, 2021

(65) Prior Publication Data

US 2025/0172698 A1      May 29, 2025

Related U.S. Application Data

(60) Provisional application No. 63/043,120, filed on Jun. 23, 2020.

(51) Int. Cl.
| | |
|---|---|
| *G01S 17/89* | (2020.01) |
| *G01S 7/481* | (2006.01) |
| *G01S 17/931* | (2020.01) |

(52) U.S. Cl.
CPC ............ *G01S 17/89* (2013.01); *G01S 7/4815* (2013.01); *G01S 17/931* (2020.01)

(58) Field of Classification Search
None
See application file for complete search history.

(56) References Cited

U.S. PATENT DOCUMENTS

| | | | |
|---|---|---|---|
| 5,926,070 | A | 7/1999 | Barron et al. |
| 7,398,287 | B2 | 7/2008 | An |

(Continued)

OTHER PUBLICATIONS

Campbell et al., Pseudorandom Noise Code-Based Technique for Thin-Cloud Discrimination with CO2 and O2 Absorption Measurements, Dec. 1, 2011 https://www.spiedigitallibrary.org/journals/optical-engineering/volume-50/issue-12/126002/Pseudorandom-noise-code-based-technique-for-thin-cloud-discrimination-with/10.1117/1.3658758.short?SSO=1.

*Primary Examiner* — Isam A Alsomiri
*Assistant Examiner* — Sanjida Naser
(74) *Attorney, Agent, or Firm* — Cozen O'Connor

(57) ABSTRACT

An imaging method includes: (I) simultaneously illuminating a scene with a first (second) diverging wave originating from a first (second) location and modulated with a first (second) shift-and-add-qualifying-code. A scatterer that scatters the first (second) diverging wave as a first (second) speckle. (II) Detecting, with a receiver, an interference signal, produced from interference between the speckle fields, and including a code temporally shifted with respect to the first SAA-code by a large-scale time-shift. (III) Circulantly correlating the interference signal with a reference SAA-code to generate a correlation signal. (IV) Determining the time-difference-of-arrival from the large-scale time-shift. (V) Determining a location of the scatterer by: determining, from the time-difference-of-arrival, a hyperbolic contour that locates the scatterer angularly; and determining, from one of (i) a small-scale time-shift of a peak of the correlation signal and (ii) a ranging delay, an elliptical contour that locates a range of the scatterer from the receiver.

13 Claims, 13 Drawing Sheets

(56) References Cited

U.S. PATENT DOCUMENTS

| | | | |
|---|---|---|---|
| 8,605,262 | B2 | 12/2013 | Campbell |
| 9,354,318 | B1 | 5/2016 | Beard et al. |
| 10,215,847 | B2 | 2/2019 | Scheim et al. |
| 2020/0132847 | A1 | 4/2020 | Hillard et al. |
| 2020/0132848 | A1 | 4/2020 | Hillard et al. |
| 2020/0363525 | A1* | 11/2020 | Liao .................... G01S 13/9004 |
| 2021/0018598 | A1* | 1/2021 | Rakuljic ............... G01S 7/4913 |

* cited by examiner

102

150(1)

155(1)    $R_2(1)$

150(2)

Matched speckle wavefronts

151(1)

$R_0(1)$

150(3)

$R_2(2)$ $R_1(2)$    $R_0(2)$ $R_0(3)$ $R_1(1)$    $R_1(3)$    $R_2(3)$

A3

112

157(1)

114

124

122

FOV            FOV

120

110 detector 130     correlator 142     128

118     A1

104, Δ imager 1000

1300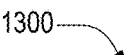

1310
Simultaneously illuminate a scene with a first diverging wave originating from a first source location and a second diverging wave originating from a second source location, resulting in a first expanding speckle field and a second expanding speckle field scattered by a scatterer in the scene and propagating toward a receiver. The first diverging wave and the second diverging wave are modulated with a first and a second shift-and-add qualifying code, respectively.

1320
Detect, at the receiver, an interference signal produced from spatially-integrated interference between the first expanding speckle field and the second expanding speckle field. The interference signal yielding a code temporally shifted with respect to the first SAA-code.

1330
Circulantly correlate the interference signal with the a reference shift-and-add qualifying code to generate a correlation signal.

1340
Determine, the time-difference-of-arrival from the large-scale time shift.

1350
Determine a location of the scatterer.

| | |
|---|---|
| 1352<br>Determine, from the time-difference-of-arrival, a hyperbolic contour that locates the scatterer angularly. | 1356<br>Determine, from one of (i) a shift of a correlation peak of the correlation signal and (ii) a ranging delay, an elliptical contour that locates a range of the scatter with respect to the receiver. |

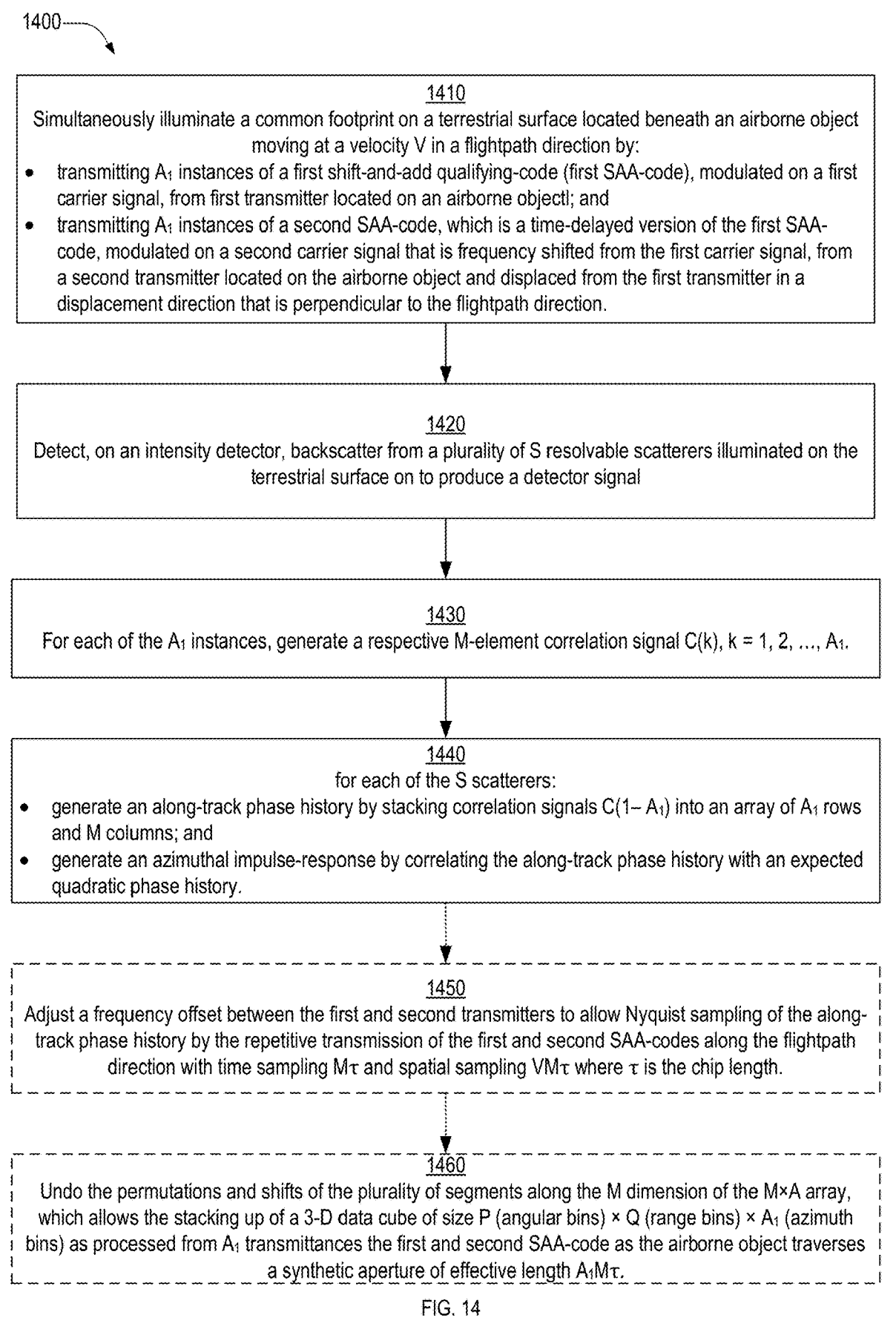

1410
Simultaneously illuminate a common footprint on a terrestrial surface located beneath an airborne object moving at a velocity V in a flightpath direction by:
- transmitting $A_1$ instances of a first shift-and-add qualifying-code (first SAA-code), modulated on a first carrier signal, from first transmitter located on an airborne objectl; and
- transmitting $A_1$ instances of a second SAA-code, which is a time-delayed version of the first SAA-code, modulated on a second carrier signal that is frequency shifted from the first carrier signal, from a second transmitter located on the airborne object and displaced from the first transmitter in a displacement direction that is perpendicular to the flightpath direction.

1420
Detect, on an intensity detector, backscatter from a plurality of S resolvable scatterers illuminated on the terrestrial surface on to produce a detector signal

1430
For each of the $A_1$ instances, generate a respective M-element correlation signal $C(k)$, $k = 1, 2, ..., A_1$.

1440
for each of the S scatterers:
- generate an along-track phase history by stacking correlation signals $C(1 - A_1)$ into an array of $A_1$ rows and M columns; and
- generate an azimuthal impulse-response by correlating the along-track phase history with an expected quadratic phase history.

1450
Adjust a frequency offset between the first and second transmitters to allow Nyquist sampling of the along-track phase history by the repetitive transmission of the first and second SAA-codes along the flightpath direction with time sampling $M\tau$ and spatial sampling $VM\tau$ where $\tau$ is the chip length.

1460
Undo the permutations and shifts of the plurality of segments along the M dimension of the M×A array, which allows the stacking up of a 3-D data cube of size P (angular bins) × Q (range bins) × $A_1$ (azimuth bins) as processed from $A_1$ transmittances the first and second SAA-code as the airborne object traverses a synthetic aperture of effective length $A_1 M\tau$.

FIG. 14

INTERFEROMETRIC IMAGER AND METHOD

CROSS-REFERENCE TO RELATED APPLICATION

This application benefits from and claims priority to U.S. provisional patent application Ser. No. 63/043,120, filed on Jun. 23, 2020, the disclosure of which is incorporated herein by reference in its entirety.

SUMMARY

We present a new approach to active radar/lidar imaging that for the first time does not require a large filled aperture in order to achieve high angular resolution. This is accomplished through the use of two transmitters (rather than one as in previous active imagers) that broadcast time-shifted versions of a long ($M=2^N-1$, with N=15-24) binary-phase-shift-keyed (BPSK) code that both flood illuminate the region to be imaged. This code has a shift-and-add property, and, in embodiments, is a pseudo-noise code. Herein, and unless otherwise specified, a "PN code" is a code that has a shift-and-add property, described herein, and may also be a pseudo-noise code. A shift-and-add qualifying code, or SAA-code, is a code that has a shift-and-add property, as described herein.

Objects that are illuminated by both transmitters backscatter both signals to a square-law receiver where they interfere, and the interferometric product between the BPSK SAA-codes produces a detected intensity modulation that depends on the time-difference-of-arrival (TDOA). The detected interferometric product signal yields a new time-shifted version of the SAA-code modulation as a result of the multiply-and-shift property of SAA codes.

Optimizing the transmitted SAA codes and time offset so that all resolvable TDOA result in highly distinguishable large time shifts allows the simple measurement of the TDOA through SAA-code correlation (a much simpler computation than previous 2-D imaging algorithms). Variations of the bistatic range provide small time shifts around each correlation peak. This provides two orthogonal curvilinear coordinates, permuted and shuffled into different segments of the long SAA-code correlation, which after de-interleaving the permuted segments enables 2-D imaging.

This is the first time that two such phase-modulated transmitters have enabled 2-D imaging without any transverse beam scanning or real-aperture resolution. A potential application of this technology would be to a forward-looking ranging radar or lidar for automotive object and collision avoidance, where the simplicity and low cost of this approach might have an important competitive advantage over existing techniques.

A third dimension of image resolvability can be obtained by placing downward looking transmitters on the wingtips of a moving airborne platform or pair of parallel flying tethered satellites through the synthetic aperture principle. In this interferometric geometry the Doppler sensitivity can be dialed in by adjusting the frequency offset of the SAA-code carriers which makes synthetic aperture lidar (SAL) practical and will provide true 3-D SAL images for the first time.

In a first aspect, interferometric imaging method includes simultaneously illuminating a scene with a first diverging wave and a second diverging wave. The first diverging wave originates from a first source location and modulated with a first shift-and-add qualifying-code (first SAA-code). The scene includes a scatterer that scatters the first diverging wave as a first expanding speckle field propagating from the scatterer toward a receiver. The second diverging wave originates from a second source location, modulated with a second SAA-code. The second source location is displaced from the first source location in a first displacement direction. The scatterer scatters the second diverging wave as a second expanding speckle field propagating from the scatterer toward the receiver.

The method also includes detecting, at the receiver, an interference signal produced from spatially-integrated interference between the first expanding speckle field and the second expanding speckle field. The interference signal yields a code temporally shifted with respect to the first SAA-code by a large-scale time-shift determined at least in part by (i) shift-and-add properties of the first and second SAA-codes, and (ii) a time-difference-of-arrival at the receiver proportional to $(R_1-R_2)/c$. $R_1$ and $R_2$ are distances between (i) the scatterer and the first source location, and (ii) the scatterer and the second source location, respectively.

The method also includes circularly correlating the interference signal with a reference SAA-code to generate a correlation signal that includes a plurality of non-overlapping segments each associated with a respective one of a plurality of angularly-resolved bins as determined by the time difference of arrival; and determining the time-difference-of-arrival from the large-scale time-shift.

The method also includes determining a location of the scatterer. This step includes (a) determining, from the time-difference-of-arrival, a hyperbolic contour that locates the scatterer angularly with respect to a depth direction perpendicular to the first displacement direction, $(R_1-R_2)/2c$ being constant for each point on the hyperbolic contour and denoting an angular coordinate; and (b) determining, from one of (i) a small-scale time-shift of a correlation peak of the correlation signal and (ii) a ranging delay, an elliptical contour that locates a range of the scatterer with respect to the receiver, $(R_1+R_2)/2c$ being constant for each point on the elliptical contour and denoting a bistatic range coordinate. The location of the scatterer is the intersection the hyperbolic contour and the elliptical contour.

In a second aspect, a bistatic synthetic-aperture lidar method includes illuminating a common footprint on a terrestrial surface located beneath an airborne object moving at a velocity V in a flightpath direction by simultaneously: transmitting $A_1$ instances of a first shift-and-add qualifying-code (first SAA-code), modulated on a first carrier signal, from first transmitter located on an airborne object; and transmitting $A_1$ instances of a second SAA-code from a second transmitter located on the airborne object and displaced from the first transmitter in a displacement direction that is substantially perpendicular to the flightpath direction. The second SAA-code is a time-delayed version of the first SAA-code, and modulated on a second carrier signal that is frequency shifted from the first carrier signal.

The method also includes detecting, on an intensity detector, backscatter from a plurality of S resolvable scatterers illuminated on the terrestrial surface on to produce a detector signal that includes interferometric beats. The method also includes for each of the $A_1$ instances, generating a respective M-element correlation signal C(k), k=1, 2, . . . , $A_1$, by repetitively circularly correlating the detector signal against a reference SAA-code of length ($M=2^N-1$). The correlation signal C(k) includes (i) P non-overlapping permuted Q-element segments each encoding a respective one of P time-differences-of-arrival indexed by an angle-of-arrival index $p(k) \le P$ and Q bistatic range delays indexed by a range index $q(k) \le Q$ and (ii) S correlation peaks.

The method also includes for each of the S scatterers: (a) generating an along-track phase history by stacking correlation signals $C(1-A_1)$ into an array of $A_1$ rows and M columns, each of the S correlation peaks displaying quadratic phase variations along the $A_1$ rows that depends on its indices $q(k)$ and $p(k)$, and (b) generating an azimuthal impulse-response by correlating the along-track phase history with an expected quadratic phase history.

In a third aspect, interferometric imager includes: a first transmitter configured to emit electromagnetic radiation in a first direction; a second transmitter laterally displaced from the first transmitter in a displacement direction perpendicular to the first direction, and configured to emit electromagnetic radiation in the first direction. The imager also includes a detector having an electromagnetic radiation-receiving surface facing the first direction; a processor communicatively coupled to the detector; and a memory storing machine readable instructions that when executed by a processor, control the processor to execute the method of the first aspect and/or the method of the second aspect.

BRIEF DESCRIPTION OF THE FIGURES

FIG. 13 is a flowchart illustrating an interferometric imaging method, in an embodiment.

FIG. 14 is a flowchart illustrating a synthetic-aperture lidar method, in an embodiment.

DETAILED DESCRIPTION OF THE EMBODIMENTS

1. Introduction

Figures 1, 2:
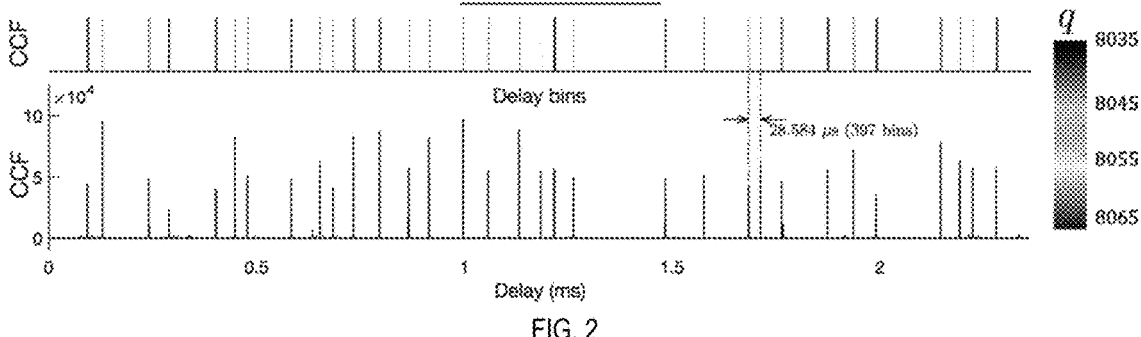
FIG. 1 is a schematic of an interferometric imager, in an embodiment.
FIG. 2.

Most approaches to imaging require a large aperture (measured in wavelengths) to achieve good angular resolution, which is why the better lenses and telescopes have big apertures. Synthetic aperture radar (SAR) transcended this limitation by just using a small aperture (the radar antenna) which transmitted out a sequence of ranging codes (typically a chirp) and measuring the backscatter from an object (the ground) and measuring the time delay with a chirp correlation receiver to achieve 1-D range imaging. To form a 2-D range-azimuth image of the ground, this single small antenna is placed on a moving platform in a side-looking geometry. As it moves through a sequence of equispaced positions from which the ranging chirp is transmitted and coherently received, a stacked up sequence of range profiles is assembled and a 2-D image is created based on the phase history of pulse-compressed returns from the illuminated targets. We describe the first 2-D imaging system that uses instead 2 stationary sources transmitting appropriately coded waveforms and 1 receiver in order to produce a 2-Dimensional range-angle image through a unique ranging (total time) and time-difference of arrival (TDOA) for angular resolution. We can extend this to a form of 3-D imaging using just 3-4 transmitters in a triangle or cross configuration. Alternatively, through a bistatic synthetic aperture configuration where the 2 transmit apertures are carried on airplane wingtips a true 3-D image can be produced.

This new active imaging system, which we refer to as PN-interferometry, can operate in either radar or lidar bands. Herein and unless otherwise specified, the terms lidar and radar are used interchangeably, such that a description of a lidar system applies equally to radar, and vice versa.

Applications include automotive collision avoidance with a pair of front-looking transmitters in the headlights or from airplanes with down looking transmitters in the wing tips. Since unlike other radar or lidar imaging schemes, our approach does not require a transverse scanning mechanism (no beam steering with a radar antenna array, or no scanning mirror for a lidar), and the transverse image resolution is performed with post-detection digital signal processing to produce the 2-D image, this promises to be an inexpensive approach to 2-D imaging. It utilizes mutually coherent coded waveform transmitters which backscatter off of rough targets and propagate back to the receiver as speckle fields which interfere at the detector as matched speckle wavefronts. This gives the advantages of coherent receivers, with the simplicity of incoherent detection, and avoids the heterodyne speckle loss that plagues existing coherent lidar system, which allows large-aperture detectors for improved signal gain and increased range. Finally, this approach utilizes a novel group-theoretic aspect of maximal-length pseudo-noise (PN) codes, the shift-and-add (or multiply-and-shift) property to achieve angular resolution, which to our knowledge has not previously been applied for this application.

2. SAA-Code Interferometry System Description

FIG. 1 is a schematic of an interferometric TDOA imager 100, which performs 2-D imaging using a pair of mutually coherent SAA-code transmitters. Imager 100 includes two SAA-code transmitters 110 and 120, and an interferometric detector 130, and a SAA-code circulant correlator 142. Transmitters 110 and 120 are located at respective source locations 118 and 128, which are separated along a direction A1 by a distance 104, herein also referred to as distance Δ.

Herein, interferometric detector 130 is also referred to as a receiver 130. In embodiments, detector 130 includes at least one of an interferometer, a lens, and a square-law detector aligned thereto such that the optical axis of the lens intersects a light-sensing surface of the square-law detector. In embodiments, receiver 130 is a non-imaging detector (that lacks either or both a pixel array and an individually addressable photodiode array for example) that produces a wideband temporal output signal. When receiver 130 includes a lens, the lens collects light onto a detector of receiver 130, which may be a smaller wideband detector or a sensitive wideband large aperture detector.

Transmitter 110 broadcasts a diverging wave 114 toward a scene 102. Diverging wave 114 includes a carrier signal modulated by a SAA-code 112. Transmitter 120 broadcasts a diverging wave 124, which is a carrier signal modulated by an SAA-code 122. In embodiments, diverging waves 114 and 124 are mutually coherent.

Each diverging wave 114, 124 scatters off each of a plurality of scatterers 150(k) each located at a respective distance with range $R_1(k)$ from transmitter 110, and $R_2(k)$ from transmitter 120. In embodiments, each scatterer 150 is a rough surface point scatterer.

In embodiments, detector 130 is located on a same side of scatterers 150 as transmitters 110 and 120. Detector 130 may be between transmitters 110 and 120, for example, at the midpoint between transmitters 110 and 120.

Each of SAA-codes 112 and 122 has a shift-and-add property, such as a modulo-2 shift-and-add property. Examples of such codes include maximal-length pseudo-noise codes, a preferred PN sequence that produces a Gold codes, and pseudo-noise (PN)-code. In embodiments, SAA-code 122, is a time-shifted version of the SAA-code 112. In embodiments, at least one of SAA-code 112 and SAA-code 122 is one of maximal-length pseudo-noise codes, a preferred pseudo-noise sequence pair that produces a set of Gold codes with minimized cross-correlations. In embodiments, SAA-code 112 has bipolar modulation. Herein, the term pseudo-noise is equivalent to pseudorandom noise, and examples of codes include bitstreams and binary sequences.

Each scatterer 150(k) scatters diverging waves 114 as an expanding speckle field 151(k) propagating back toward receiver 130 located at a distance $R_0(k)$ from scatterer 150(k). Speckle field 151(k) is a time-delayed SAA-code BPSK phase-modulated field, and has a time-delayed SAA code 152(k) modulated thereon. Each scatterer 150(k) also scatters diverging wave 124 as an expanding speckle field 155(k) propagating back toward receiver 130. Speckle field 155(k) is a time-delayed SAA-code BPSK phase-modulated field, and has a time-delayed SAA code 156(k) modulated thereon. For clarity of illustration, of speckle fields 151(1-3) and 155(1-3), only speckle fields 151(1) and 155(1) are shown in FIG. 1, and no time-delayed SAA code 156 are illustrated.

In embodiments, each diverging wave 114 has a bit time τ≈0.1 ns and bandwidth $$B = \frac{1}{\tau} \approx 10 \text{ GHz.}$$

In embodiments, and the carrier signal is an optical carrier with a center frequency between 30 THz and 650 THz, e.g., 200 THz for lidar applications, or a mm-wave carrier with a center frequency between 30 GHz and 300 GHz, e.g., 70 GHZ, for automotive radar.

At receiver 130, speckle fields 151(k) and 156(k) arrive with the same speckle field profile since they backscattered off the same rough surface of scatterer 150(k), and the matched wavefronts interfere to produce an interference signal 157(k) detected by receiver 130. Interference signal 157(k) has a high-modulation depth intensity and contains a beat note modulated by the product of the two time-delayed SAA-code phase-modulated fields 151(k) and 155(k). For SAA codes, this interferometric product will yield a time shifted replica of the SAA code as a detected intensity modulation, due to the multiply-and-shift property of SAA-code Galois fields, where the resulting time shift may be large even for tiny time delays (one or more τ) between the two multiplying codes.

This distinctive property is not shared by other typical waveforms. For example, the product of chirps (linear frequency modulation) produces CW tones, whose frequency is often used for ranging, but small shifts only cause small changes of the beat frequency. By contrast, for SAA-codes this property allows measurement of the tiny relative time delay of the arriving fields by determining the large shift of the correlation peak of the interferometric product using a circulant SAA-code correlator.

A key feature of embodiments disclosed herein is the large time shift caused by the shift-and-add property of SAA-codes. A one-resolvable-bit relative delay (say 0.1-1 ns) can give a full code time delay (say 0.1-1 ms). Previous methods with a tiny time delay (0.1-1 ns) give a tiny resulting output signal effect (say delayed by 11 ns) that is indistinguishable from just a range delay due to a slight change of the range. In contrast, the 0.1-1 ms delay of the SAA-code interferometric beat (0.1-1 ms) is clearly not just a slight range delay since that much delay would correspond to 15 km-150 km of range change, at which point the target would be so far away as to not be detectable. This allows the multiplexing of these TDOA shifts within the large code space of the output correlation Different TDOAs causes phase-modulated fields 151 and 155 to have different time delays to the target (detector 130), so when diverging waves 114 and 124 both scatter back from the target to detector 130 (as fields 151 and 155) with common time delay, they arrive at detector 130 with shifted time delays. The BPSK signals (fields 151 and 155) act like +1 and −1 values that add up and interfere at detector 130. There are four cases: (i) $|(+1)+(+1)|^2=4$, (ii) $|(+1)+(-1)|^2=0$, (iii) $|(-1)+(+1)|^2=0$, and (iv) $|(-1)+(-1)|^2=4$. This acts like a XOR, which gives the Galois field property of mod 2 (XOR) addition of the binary sequences, as discussed below in section 3.

FIG. 2 illustrates an example interferometric SAA-code shifted correlation theory 210 and experimental results 220 from a related preliminary-low bandwidth high-SNR experiment. This experiment relied on the same differential time delay shift-and-add effect to time shift interferometrically detected PN code products, although the time delays in this case are at a much lower bandwidth (14 MHz) and the delays are caused by counter-propagating acoustic waves in a pair of telescopically imaged acousto-optic devices instead of propagation induced time delays as presented here. It is shown here to illustrate the extraordinarily high fidelity and signal-to-noise ratio of the resulting differentially time delayed BPSK-modulated PN-code interferometric detection and circulant code correlation, the nearly ideal matching with theory, and the very large correlation peak time shifts spanning the full 2.36-ms long ($M=2^{15}-1$) chip (each 72 ns wide) correlation for each of just a few small differential time delays of 72 ns.

Figure 3:
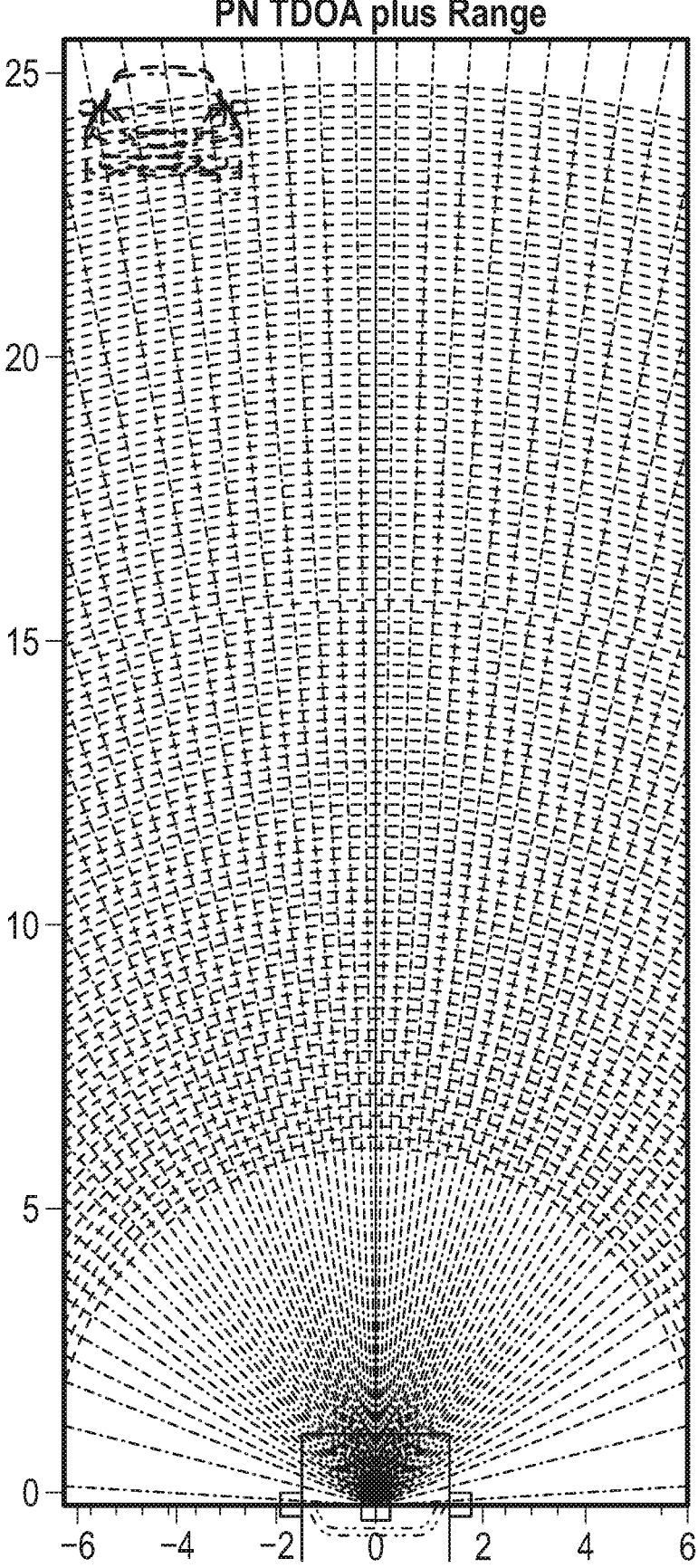
FIG. 3 depicts hyperbolic TDOA plus bistatic elliptical range orthogonal curvilinear coordinates for an automotive lidar scenario, in an embodiment.

FIG. 3 depicts hyperbolic TDOA plus bistatic elliptical range orthogonal curvilinear coordinates for an automotive lidar scenario with forward-looking transmitters mounted on the rear-view mirrors showing an imaging grid out to 25 m. Transmitters 110 and 120 are located at respect foci of the hyperbolae and ellipses.

Displacing the target along the green hyperbolic contour (at which $R_1-R_2=$const) in FIG. 3) by a distance $\Delta r$ will simultaneously change both $R_1$ and $R_2$ by the same amount and will just give an additional time delay $\Delta t=2\Delta r/c$ to the interferometrically detected BPSK SAA-code product, which can be resolved by the SAA-code correlator as a small shift, $\Delta t$, of the correlation peak, where c is the speed of light.

Displacing the target along the orthogonal bistatic iso-range elliptical contour in FIG. 3 will change the time-difference-of-arrival (TDOA=($R_1-R_2$)/c) delineated by the hyperbolic contours. Each ellipse has foci at transmitters 110 and 120 such that $R_1+R_2$ is constant. This displacement will cause a large time delay of the detected SAA code given by the product of delayed phase-modulated SAA codes, and this large time shift can also be determined by the same SAA code correlator used for ranging.

To avoid crosstalk between these modalities it is necessary to judiciously choose the best long SAA code and optimum time offset of the transmitters so that the product of small TDOA SAA-codes produces P very different time delays uniformly scattered across the full code length $M=2^N-1$. The minimum bit separation between correlation peaks, Q, must be sufficient to resolve the desired range swath width, $\Delta R<Q\tau c/2$, where $\tau$ is the SAA-code bit time.

Figure 4:
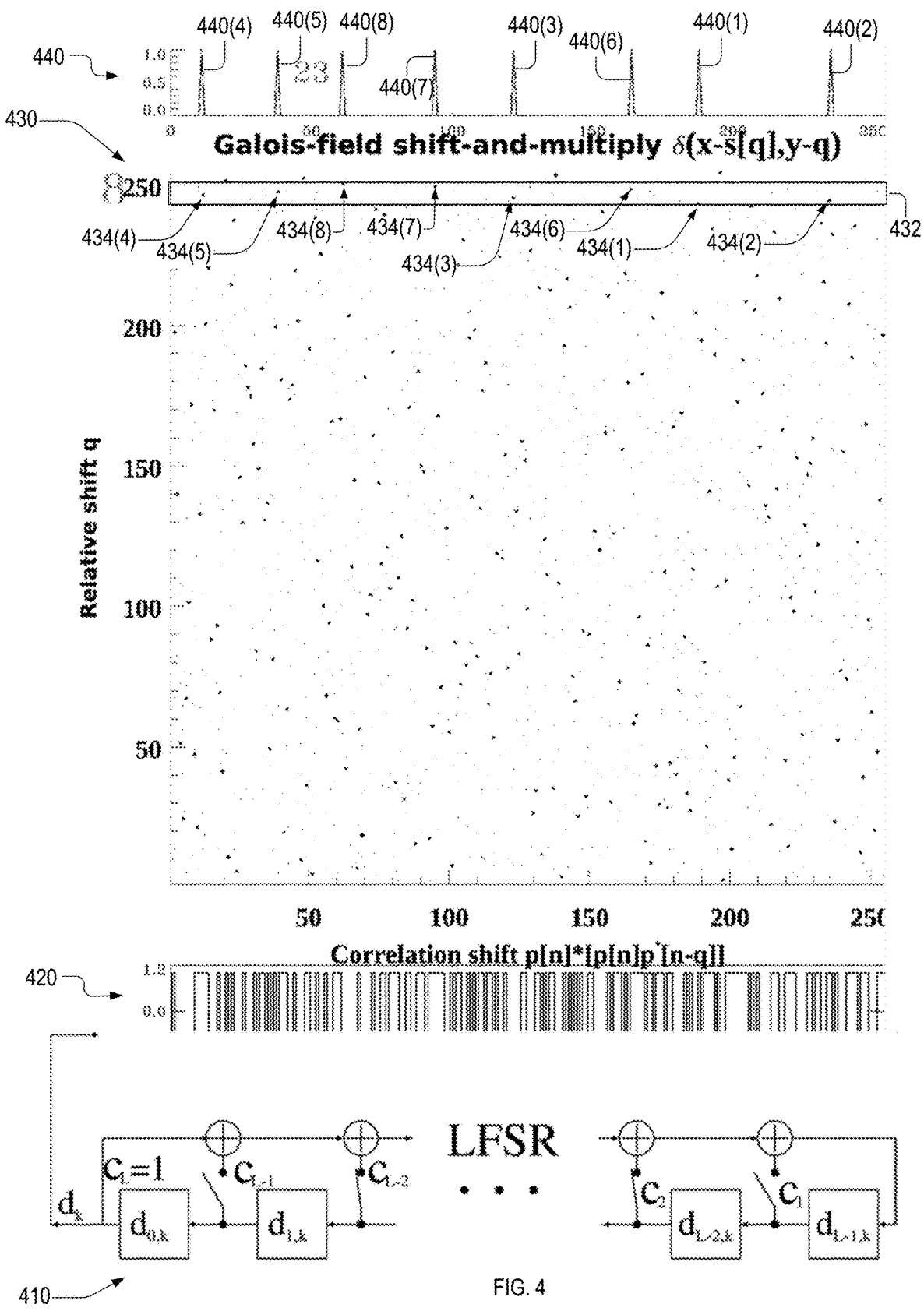
FIG. 4 is an illustration of the SAA code multiply-and-shift correlation output along the rows for all possible shifts of a SAA code, in an embodiment.

FIG. 4 is an illustration of the SAA code multiply-and-shift correlation output along the rows for all possible shifts of a short, $M=2^8-1$, SAA code, and selection of a small TDOA window 432 (width equals 8) that provides well-separated shifted SAA-code product correlation peaks 440, each surrounded by an unambiguous ranging window (of 23 range bins) allowing 2-D imaging.

TDOA window 432 is a section of a correlation surface 430 corresponding to a specific range of shift integers q. Correlation surface 430 shows, for each value of shift integer q a ranging from 1 to 255, a corresponding correlation between SAA-code 112 and interference signal 157. TDOA window 432 determines the number of peaks in correlation surface 430 and a range of TDOA values that can be resolved. FIG. 4 depicts an LFSR 410 that generates a SAA-code 420.

An example of this code window selection for a small SAA code is shown in FIG. 4, where eight correlation peaks 440 are somewhat uniformly scattered throughout a $M=255$ with minimal separation Q=23 allowing an 8×23 image to be measured. In this fashion using much longer SAA codes an entire 2-D range-angle image of scatterers can uniquely and individually be resolved within the illuminated grid of P×Q resolvable range ellipses and TDOA hyperbolas, all folded up and permuted into the long correlation function, allowing 2-D imaging by undoing the permutation, without requiring any angular scanning mechanism.

In embodiments, this permutation mapping between the shifted segments of the long correlation function is determined by the shift-and-add property of the particular code and the selected window, e.g., TDOA window 432. The selected window may be chosen to balance a tradeoff between (i) maximizing the separation between correlation peaks and (ii) including as a sufficient number of correlation peaks to satisfy any requirements on the number of resolvable TDOA angular bins.

This is a unique imaging functionality that to our knowledge has never been previously explored, and has potentially high-impact application for reducing the cost of automotive Radar/lidar, and fundamental engineering and scientific application for remote sensing when extended to 3-D bistatic synthetic aperture imaging from moving airborne platforms.

TDOA window 432 includes a plurality of correlation maxima 434(*m*), where index m is a positive integer and m≤8. Each value of m corresponds to a value of offset q. Correlation peaks 440 are a projection of correlation maxima along the vertical axis that indexes values of q. Hence, correlation peak 440(*m*) represents correlation maximum 434(*m*)

Correlation maximum 434(4) is at the center of TDOA window 432 along the vertical (q) axis. Hence, correlation maximum 434(4) corresponds to a center value of the magnitude of time-difference of arrival, which is the known delay between SAA-codes 112 and 122 transmitted by transmitters 110 and 120 respectively, FIG. 1. Correlation maxima corresponding to smaller values of q are maxima 434(1,2,3), which correspond to respective negatively-shifted time differences of arrival, $\Delta t_1$, $\Delta t_2$, and $\Delta t_3$ where $\Delta t_1<\Delta t_2<\Delta t_3$. Correlation maxima corresponding to larger values of q are maxima 434(5,6,7), which correspond to respective positively-shifted time differences of arrival, $\Delta t_5$, $\Delta t_6$, and $\Delta t_7$ where $\Delta t_5<\Delta t_6<\Delta t_7$.

A process for generating correlation peaks 400 includes jointly determining a shift-and-add qualifying code and range of delays (values of q) applied to a shifted version of the shift-and-add qualifying code, such that a correlation of a reference code with the product of the shift-and-add qualifying code and the shifted shift-and-add qualifying code has evenly spaced projection of correlation peaks across the length of the code. The number of said correlation peaks determines an angular resolution of the imaging system. A shift-and-add qualifying code, or SAA-code, is a code that has a shift-and-add property, as described below.

Each correlation peak 440(*m*) can be mapped to a time-difference of arrival according to a look-up table that is specific to SAA-code 112.

3. PN Interferometry

PN (or pseudo-noise) sequences are binary sequences, $a_m\in\{0,1\}$ (or $A_m=2a_m-1\in\{-1,1\}$), that are easily generated using a Linear Feedback Shift Register (LFSR) of length N with feedback of the modulo-2 addition (XOR) of a specified set of taps, $c_n$, as shown in FIG. 3. Maximal length (or m-sequences) are PN sequences that repeat after a length $M=2^N-1$. They have important applicability to current radar and lidar ranging systems due to their nearly perfect circulant autocorrelation property that has a peak value of $2^N-1$ and all autocorrelation sidelobes are $-1$ (or between 0 and $-1$ for continuous-time correlation). Cross-correlation between different PN sequences do not have such ideal behavior, with sidelobes of approximately $\sqrt{M}$, as do autocorrelations of a single replica of a PN sequence, but nonetheless the related Gold codes are the basis for GPS. Instead, we utilize shifted versions of the same code and their ideal circulant correlations in a completely novel fashion for our new approach to 2-D (and 3-D) imaging.

To do this we make use of the shift-and-add property in which the bitwise modulo-2 addition of a sequence (with shift $q_1$) with a shifted copy of the same sequence (with shift $q_2$) produces a shifted version of the same sequence, $a_{m-r}=a_{m-q_1}\oplus a_{m-q_2}$, hereinafter equation (1) where $\oplus$ represents modulo-2 addition (XOR) between the bits of the shifted sequences. In equation (1), $a_{m-r}$ represents interference signal 157, $a_{m-q_1}$ represents the BPSK code that modulates diverging wave 114, and $a_{m-g_2}$ represents the BPSK code that modulates diverging wave 124. The relative delay between the BPSK codes is $q=q_1-q_2$. The shift, r, is a complex and unique function of relative delay $q=q_1-q_2$ for that specific m-sequence, which can be expressed as a delay $r=q_1-d[q_1-q_2]$. Herein, a code, sequence, or bit sequence that satisfies equation (1) is referred to as a shift-and-add qualifying code, shift-and-add qualified sequence, or a shift-and-add qualified bit sequence. Herein, "shift-and-add qualifying" is abbreviated as SAA.

For a LFSR with taps $c_n$, . . . , $c_0$, with generating polynomial $$G(x) = \sum_{n=0}^{N} c_n x^n,$$

the shift, d[q], can be analytically expressed in terms of the discrete logarithm and the remainder after polynomial long division, which is rather complex. A simpler method is to determine shift d[q] mechanistically, as shown in FIG. 4. Our bistatic active imaging system makes use of the isomorphism between modulo-2 addition of the {0,1} bits defining a PN-sequence and the product of the bipolar representation of these bits $A_m \in \{-1, +1\}$. These bipolar values are encoded on a temporal carrier, $e^{i\omega t}$, as a BPSK modulation, with 0 and $\pi$ phase shifts controlled by the PN sequence, and the interferometrically detected product between two such coherent relatively time delayed coherent modulations yields a time shifted version of the SAA code as an intensity modulation.

By numerically searching the SAA codes we can identify the particular offset time shift that maximizes the separation between the time shifts over a given shift window for each m-sequence at each code length. An example of an optimized correlation window for an $M=2^{10}-1$ SAA-code (indicated by the LFSR taps) that maximizes the unambiguous range window (48 time bins for 16 shifts) is shown in FIG. 5.

Figure 5:
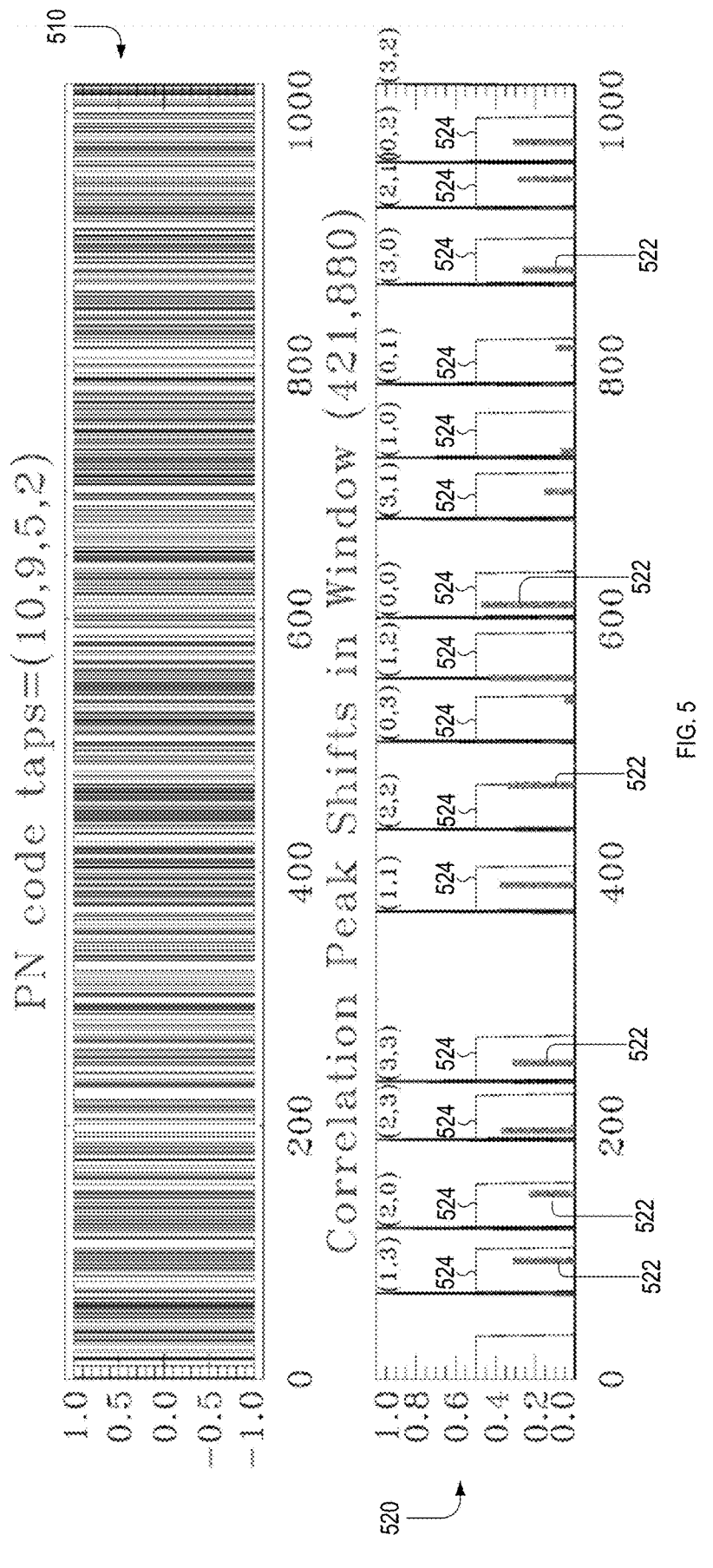
FIG. 5 illustrates a particular SAA-code and the correlation peaks resulting from shifted SAA-code products optimized to separate the code shifts by the widest possible separation, in an embodiment.

FIG. 5 illustrates a particular SAA-code 510 of length $2^{10}-1=1023$ and a correlation signal 520, which includes correlation peaks 522, resulting from shifted SAA-code products optimized to separate the code shifts by the widest possible window 524 (rectangle of width $Q \geq 48$), which determines the unambiguous range following each of the SAA-code product shifted peaks for these 16 shifts. For clarity of illustration, not all correlation peaks 522 and windows 524 are labeled in FIG. 5. Each window 524 corresponds to a non-overlapping segment (with length $Q \geq 48$) of correlation signal 520 that corresponds to a target range.

Figure 6:
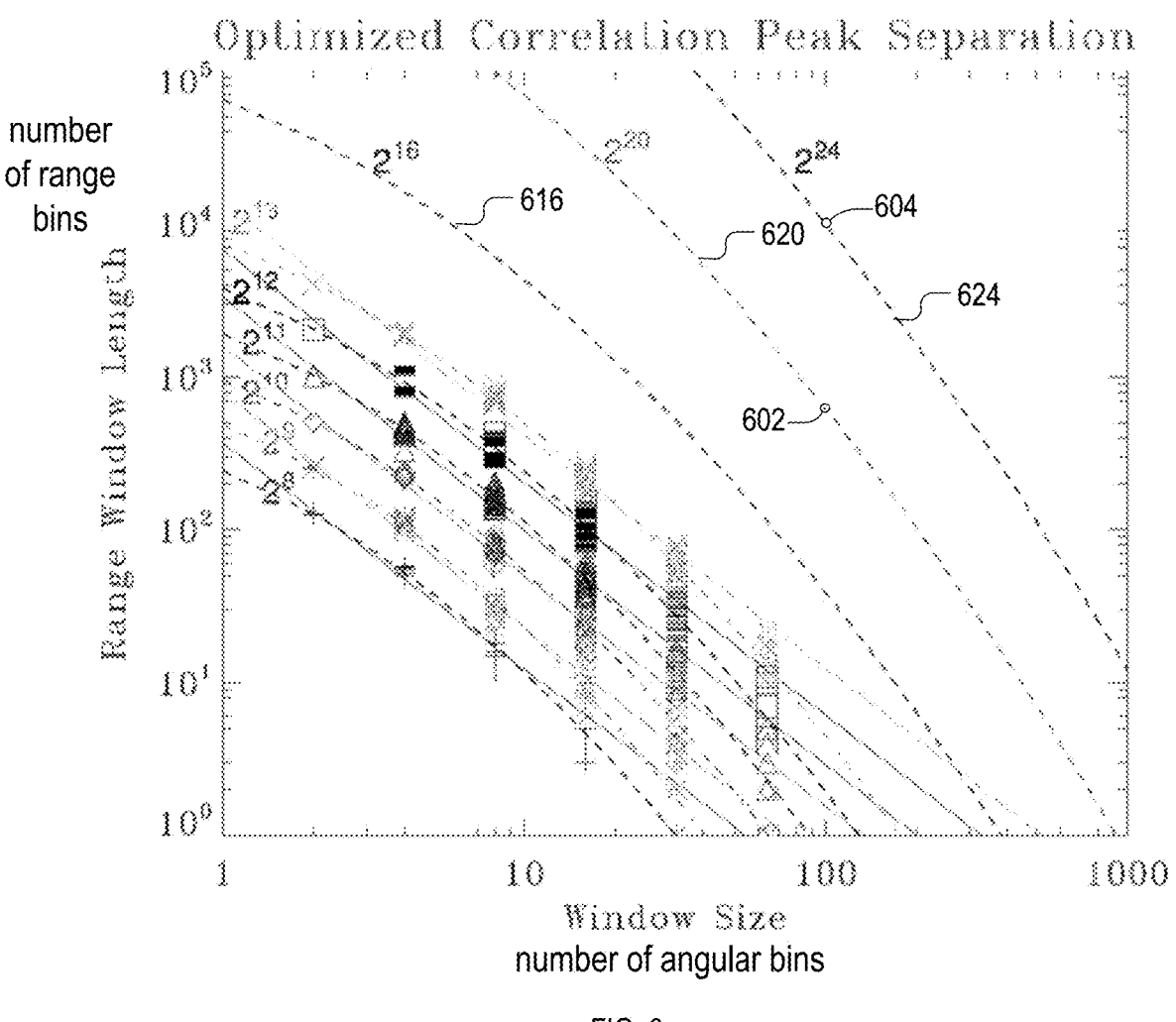
FIG. 6 is a graph showing numerical optimization for the maximized unambiguous range windows for spreading SAA-code product shifts throughout the code length, for SAA codes of varying length, in an embodiment.

But this is actually far too short a SAA code for this application, so the numerical optimization of the maximum unambiguous range windows for all known m-sequences for LFSR of lengths $2^8-2^{13}$ is shown in FIG. 6. FIG. 6 is a graph showing numerical optimization for the maximized unambiguous range windows for spreading SAA-code product shifts throughout the code length, for SAA codes of varying length. Fits are extrapolated to SAA codes of length $2^{16}-1$ (fit 616), $2^{20}-1$ (fit 620), $2^{24}-1$ (fit 624). FIG. 6 indicates that one hundred angular bins should allow six hundred range bins for codes of length $2^{20}-1$ (point 602), corresponding to 150 m range window at 10 GHz BPSK SAA-code bandwidth.

A numerical fit to this behavior is indicated by the dotted lines, and extrapolated to even longer codes with LFSR lengths of 16, 20, and 24, indicating a useful regime for the applications of automotive radar as well as airborne bistatic PN-interferometric Synthetic Aperture Radar 3-D imaging.

Figure 7:
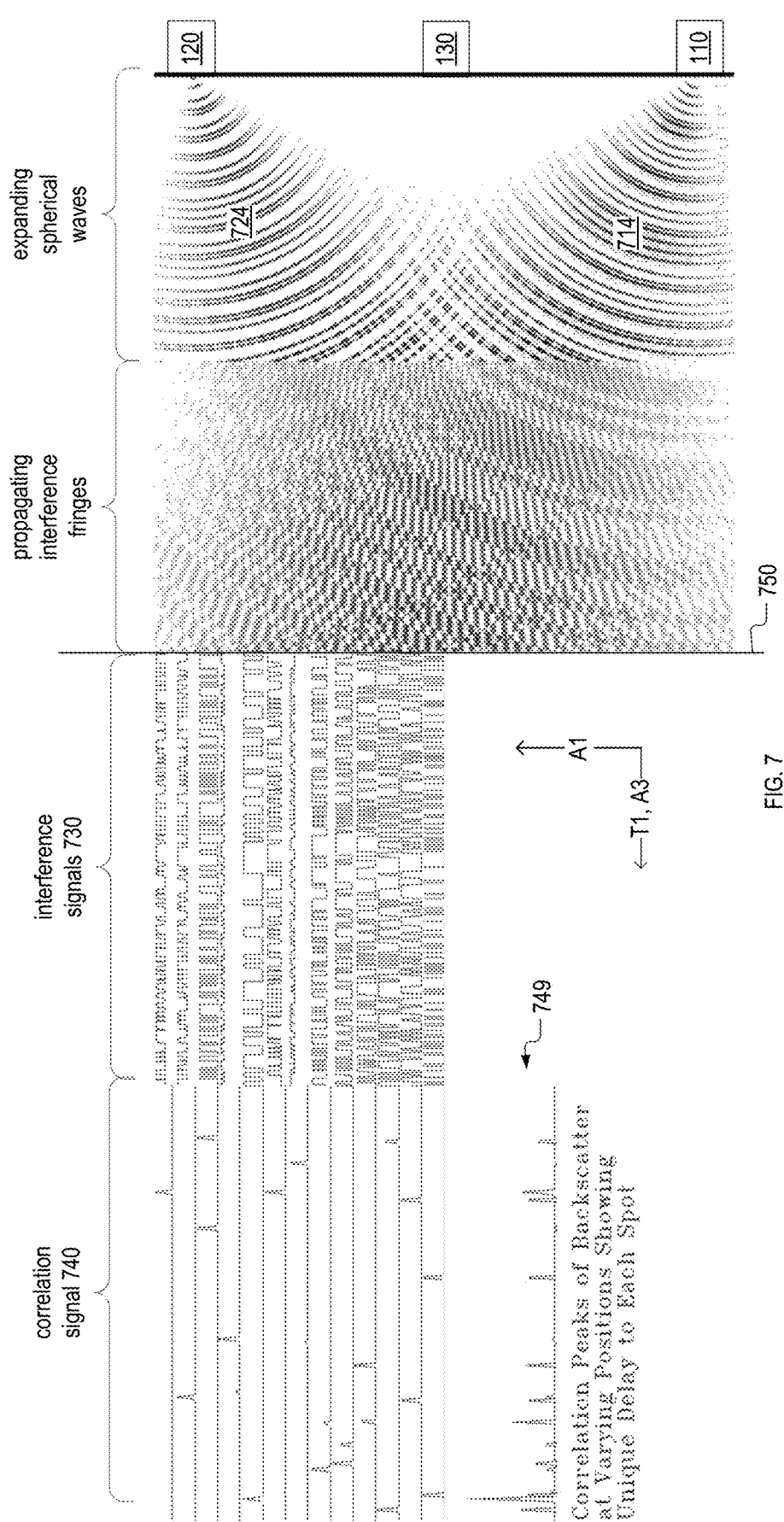
FIG. 7 illustrates a simulation the operation of a SAA-coded bistatic interferometry system that includes transmitters of the interferometric imager of FIG. 1, in an embodiment.

FIG. 7 illustrates a simulation the operation of a SAA-coded bistatic interferometry system that includes transmitters 110 and 120 of imager 100. FIG. 7 depicts simulation results that illustrate PN-interferometry from transmitters 110 and 120 on the right, producing expanding spherical waves 714 and 724 propagating to the left. Spherical waves 714 and 724 are respective examples of diverging waves 114 and 124. Halfway between transmitters 110, 120 and a target 750, the display switches to an intensity mode displaying the propagating interference fringes resulting from interference of expanding spherical waves 714 and 724. Sampling points at a single plane display along direction A1, the interferometric product is detected as a time domain variation (along a temporal axis T1) displaying the shifted SAA code as an intensity modulation, denoted as interference signals 730. Each interference signal 730 is an example of interference signal 157.

Circulant correlation against the reference code, which is modulated onto spherical wave 714 or 724, yields a plurality of correlation signals 740 each corresponding to a respective interference signal 730. Each correlation signal 740 includes an isolated correlation peak due to each spatial offset position in direction A1. Detector 130 detects correlation peaks as their sum, shown as a backscatter signal 749.

A real system would use much longer SAA codes with more TDOA/range bins. Since an entire two-dimensional image is folded up into separate permuted and shifted segments of the circulant correlation function (which is the same length $M=2^N-1$ of the maximal length PN code) but must contain at least P permuted and shifted segments from the PN-code shift-and-add window containing Q range bins each, due to the random like scattering of the segments the code must have length $M \gg PQ$, so for high resolution 2-D imaging (with P and Q between 100 and 1000) N is likely at least 15 ($M=2^{15}-1$) and likely larger than 20 ($N=2^{20}-1$). To keep the code repetition rate to a reasonable time to allow additional functionality (such as kHz bandwidth Doppler sampling in Synthetic Aperture Lidar) even at a very high chip rate exceeding 10 GHz, millisecond code repetition times will require N<24 (and $M<2^{24}-1$).

When sampling point along direction A1 at target 750 has a TDOA that is a fraction of a bit time of the SAA code, two such correlation peaks result from adjacent overlaps and computing the ratio of the correlation-peak amplitudes can super-resolve the position. The ratio of the amplitude of one correlation peak and the adjacent TDOA-shifted correlation peak, enables a determination of what fraction of the chip width $\tau$ the TDOA has changed. Half way between the TDOA delayed by an exact shift of a full chip width $\tau$, the two correlation peaks would be equal.

Note for a very small change of the differential time delay (approximately the width of one of the correlation peaks) between adjacent sampled waveforms, very large shifts of the SAA code product correlation peaks result.

The simulation results shown in FIG. 7 only illustrate the propagation of the fields out to some distance in direction A3, and the intensity detection at the plane of target 750, while in remote sensing, there would be a backscattering of the fields from both transmitters back toward a square-law detector, which is an example of detector 130. This subsequent propagation of the weak speckled field and its interference at the receiver is difficult to illustrate graphically, and is known to be linear in the intensity, so is instead shown as an intensity detection at the position of the point scatterers, even though interferometric intensity detection is actually back at detector 130 and does not take place on the scattering targets (except in the case of nonlinear or fluorescing objects).

As the individual scatterers are displaced in height (in direction A3), the time delay of the square-law detected backscatter changes slightly, giving small shifts of the correlation peaks from their nominal position. Thus 2-D imaging is determined from the summed correlations in which big shifts of the correlation peaks are due to transverse motions of the targets (in direction A1), small shifts of the correlation peaks around their nominal positions are due to displacements of the individual scatterers in direction A3, and the amplitude of the correlation peaks determines the strength of the scatterers. Thus, an entire 2-D image is encoded in the correlation function of the summed square-law detected return, but in a permuted and shifted segmented regions of the PN correlation of the returns.

Figure 8:
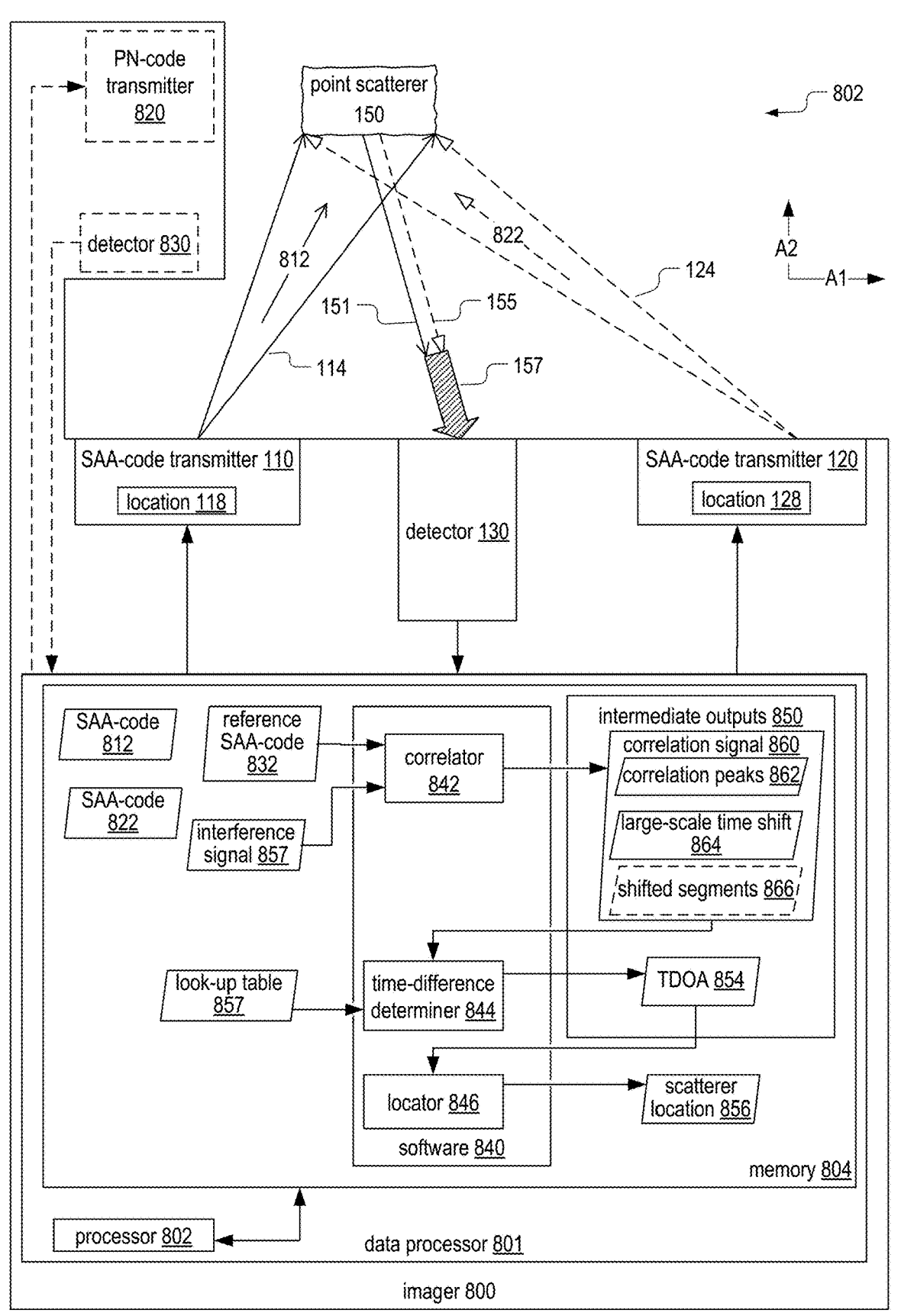
FIG. 8 is a schematic of an interferometric imager, in an embodiment.

FIG. 8 is a schematic of an interferometric TDOA imager 800 that images scatterer 150 in a scene 802. Imager 800 is an example of interferometric TDOA imager 100, FIG. 1. Imager 800 includes transmitters 110 and 120, detector 130, and a data processor 801. Data processor 801 includes a processor 802 and a memory 804 communicatively coupled thereto. FIG. 8 depicts imager 800 imaging scatterer 150, which may be any one of point scatters 150(1-3).

In embodiments, interferometric TDOA imager 800 also includes a SAA-code transmitter 820 and a detector 830, each of which displaced from SAA-code transmitter 110 in a direction A2, which may be perpendicular to direction A1. In embodiments, transmitters 110, 120, and 160 are located at corners of a right triangle.

Memory 804 may be transitory and/or non-transitory and may include one or both of volatile memory (e.g., SRAM, DRAM, computational RAM, other volatile memory, or any combination thereof) and non-volatile memory (e.g., FLASH, ROM, magnetic media, optical media, other non-volatile memory, or any combination thereof). Part or all of memory 804 may be integrated into processor 802.

Memory 804 stores codes 812 and 822 examples of which include SAA-codes 112 and 122 respectively. Memory 804 stores interference signals 857, which is a digitized representation of interference signal 157, which, as a detected intensity, may be a unipolar modulated signal.

Memory 804 also stores a reference SAA-code 832. In embodiments, for example when the SAA-code 812 is a maximal length pseudonoise sequence, reference SAA-code 832 is one of (i) SAA-code 812, (ii) second SAA-code 822, (iii) a SAA code that is circulant delay offset of either the first SAA-code or the second SAA-code, and (iv) any combination thereof.

Memory 804 also includes software 840, which includes machine-readable instructions. Software 840 includes correlator 842, which is an example of correlator 142, FIG. 1. Processor 802 is adapted to execute the machine-readable instructions to perform functions of TDOA imager 800 as described herein. In embodiments, data processor 801 controls SAA-code transmitters to modulate respective diverging waves 114 and 124 with respective codes 812 and 822.

Memory 804 also stores intermediate outputs 850, which include correlation signal 862 and time-difference-of-arrival (TDOA) 854. In embodiments, correlation signal 860 includes at least one of correlation peaks 862 and a large-scale time shift 864. Correlation signal 860 may include a plurality of shifted segments 866, each of which is non-overlapping with adjacent segments thereof, and includes range information for a given angular bin corresponding to each segment. In embodiments, memory 804 stores a look-up table 857 that maps each correlation peak 862 a time-difference of arrival 854 according. Look-up table 857 is specific to SAA-code 112.

4. Automotive Lidar/Radar Scenario

The PN interferometric range/TDOA system might find a useful application as a forward-looking automotive object detection and avoidance imaging system. Placing the two time delayed SAA code transmitters on the tips of the rear-view mirrors looking forwards, as shown in FIG. 3, will provide the largest baseline with greatest TDOA sensitivity, although the two forward looking fan beams would not overlap until a few meters in front of the vehicle. The unambiguous range interval can be aligned to this minimum range, and closer ranges can be acquired with other proximity sensors. The divergence angle of these two beams can be set to cover the desired angular range, say $\pm 30°$. As with all coded waveform ranging techniques, the range resolution is determined by the bandwidth and SAA-code bit rate, and in addition must be extremely high speed to achieve the necessary angular resolution using this SAA-code interferometry. For a radar implementation operating at the automotive radar band at 70 GHz center frequency, B=10-20 GHz BPSK SAA-code modulation is realistic, and such binary phase modulation would actually be much simpler than 5 GHz bandwidth analog RF chirp direct digital synthesizers currently being developed for automotive radars. With an optical implementation, more precise fan geometry laser beam sculpting could be employed to improve the link budget, and the wider bandwidth capabilities of photonic technologies could enable BPSK modulations with B=40 GHz bandwidth or more. The backscatter of the transmitted BPSK SAA code from a target at position $\vec{r}=(x, z)$ from the transmitters at position z=0, $x=\pm\Delta$ (the rear-view mirrors), detected on the front grill, will contain an interference between the back scattered time delayed speckle fields integrated across the receiver aperture. The time delays are $\tau_1=(R_1+R_0)/c$ and $\tau_2=(R_2+R_0)/c$, where $R_1=\sqrt{(x+\Delta)^2+z^2}$, $R_2=\sqrt{(x-\Delta)^2+z^2}$, and $R_0=\sqrt{x^2+z^2}$, and the difference of time delays that determines the SAA-code shift from the interferometric product can be approximated as $$\Delta\tau = \tau_2 - \tau_1 \approx \frac{2x\Delta}{z}.$$

The motion along the transverse direction that results in a SAA-code single bit time delay, $\tau=1/B$, that will enable a shifted SAA-code from the interferometric BPSK product is $$\Delta x = \frac{c}{B}\frac{z}{2\Delta},$$

which determines the angular resolution of this radar/lidar imaging system shown as the green hyperbolic contours in FIG. 3). In the range direction, the correlation of the SAA-coded return, shifted by the TDOA code interferometry (and achieving an unambiguous range window out to the desired sensitivity limited range of $Q\tau$=100-200 m) is resolvable for a change of range $\Delta R$=c/2B. For the mm-wave 70 GHz radar parameters with B=20 GHz at a range of z=20 m this allows range resolution of $\Delta R$=1.5 cm and transverse resolution of $\Delta x$=10 cm. For a lidar with a bandwidth of B=40 GHz these drop by a factor of 2, achieving sufficient resolution for most automotive object avoidance applications.

5. Orthogonal Plane Imaging with PN Interferometry

An L, T, or + (cross) shaped transmission aperture with three transmitters enables additional PN-interferometry for determining the orthogonal coordinates of objects. In the following description, transmitters 110, 120, and 820 (FIG. 8) are examples of transmitters 1, 2, and 3, respectively. Also, detectors 130 and 830 are examples of antennas 1 and 3 respectively. This is accomplished through the simultaneous PN-interferometry between transmitters 1 and 2 along the horizontal plane and antennas 1 and 3 in the vertical plane. In this geometry, we do not need the interference between transmitters 2 and 3, which can be enabled by making transmitter 1 and 3 orthogonally linearly polarized, (V for 2 and H for 3) while the common transmitter 1 at the vertex of the L would have a circular or 45 degree linear polarization, then using two detectors, one preceded by a vertical (V) linear polarizer to detect the interference between 1 and 2 and the other with a horizontal (H) linear polarizer to detect the interference between 1 and 3. Another embodiment would instead make use of a Gold code (formed as the product of two maximal length PN sequences $g[m]=p_1[m]\oplus p_3[m]$ or $g[m]=p_1[m]\oplus p_2[m]$)) by transmitting $p_1[m]$ as the coherent BPSK transmission from the vertex of the L, and then transmitting a delayed version (by $m_2$) of the preferred pair codes, $p_2[m-m_2]$, from one arm of the L and a delayed version (by $m_3$) of one of another PN code, $p_3[m-m_3]$, from the other arm of the L. The interference at the detector between differently delayed versions of $g(m/B-R_1/c)$ with $p_2(m/B-R_2/c)$ and with $p_3(m/B-R_3/c)$ yields a new shifted Gold code phase that can be detected with a correlation for each dimension, but no such result from the direct interference of $p_2$ and $p_3$ since they are orthogonally polarized. The new shifted Gold code is dependent on $[m_2-(R_1-R_2)B/c]$ for the $p_1p_2$ pair. The Gold code is dependent on $[m_3-(R_1-R_3)B/c]$ for the $p_1p_3$ interferometric pair. For the $p_1p_2$ pair and the $p_1p_3$ pair, the code phase dependent on $(R_1+R_2)/2c$ and $(R_1+R_3)/2c$ respectively.

In embodiments, such as in automotive applications, a triangular array of transmitters includes transmitters in the vehicle headlight (or rear-view mirrors) and the third on the vehicle roof. In a truck, the height of the cab is sufficient for a roof mounted transmitter to achieve vertical resolution as good as the horizontal resolution, either in an L shaped geometry as described above, or in a triangle, or in a + (cross) configuration.

It needs to be emphasized that these crossed imaging systems each individually do not achieve any orthogonal plane resolution, so this is not a true 3-D imaging system, and instead each PN-interferometric system contains 2-D projections of the 3-D image. But for sparse 3-D object surfaces containing just a few strong scatters (e.g. pedestrians, bicycles, cars, stop signs, etc.) then we can combine the 2-D projections to get a 3-D image, and adding a third projection angle (using the 3rd leg of the triangle) could improve the estimation of the 3-D image.

A final 3-D imaging variant could instead employ a vertical array of receivers each of which independently performs the scannerless PN interferometric 2-D imaging in parallel. This system is more reminiscent of a flash lidar or ubiquitous multibeam radar than it is a conventional scanned-beam lidar, which sequentially directs all its energy in one direction, listens to the return echo, then moves on to the next angle. This system transmits to and listens to all angles in parallel. But unlike previous systems, has no transmit aperture or beamsteering along the horizontal axis, but along the vertical axis uses a collecting imaging receiver to interferometrically detect the time-delay-of-arrival (TDOA) product between the two SAA-coded speckle field and produce a SAA-code shift that allows the scannerless imaging along the horizontal axis.

6. Bistatic Synthetic Aperture Lidar (SAL)

Figure 9:
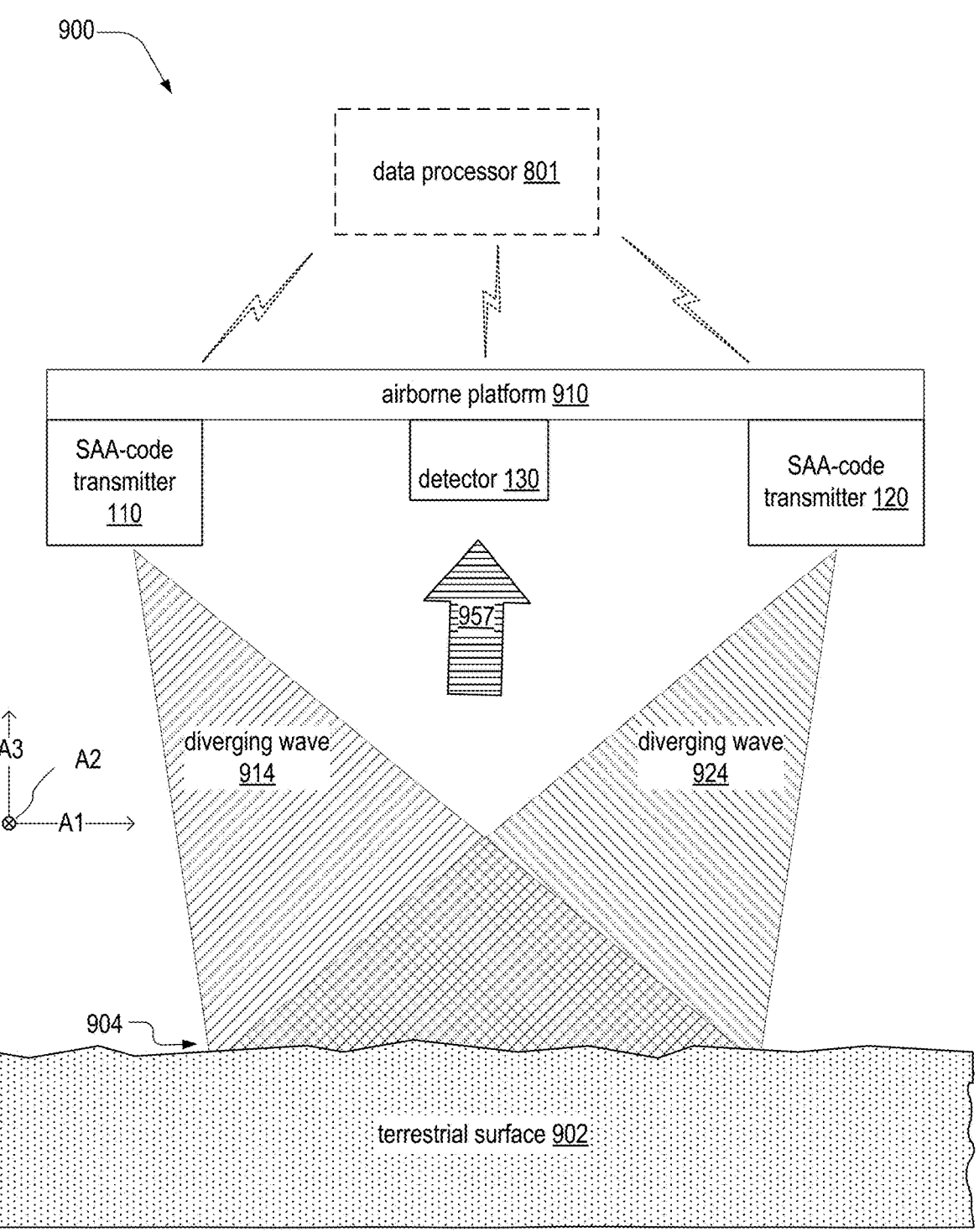
FIG. 9 is a schematic of bistatic synthetic aperture lidar (SAL), which is a use scenario of the interferometric TDOA imager of FIG. 1.

FIG. 9 is a schematic of a bistatic synthetic aperture lidar transceiver 900, which is an example of interferometric TDOA imager 100. Transceiver 900 includes an airborne platform 910 with transmitters 110, 120, and detector 130 thereon. In embodiments, transceiver 900 also includes data processor 801, which is communicatively coupled to detector 130 and may also be communicatively coupled to each of transmitters 110 and 120.

Transmitters 110 and 120 emit respective diverging waves 914 and 924, which propagate toward a terrestrial surface 902. In operation, airborne platform is travelling in a direction A2, which is perpendicular to direction A1 along which transmitters 110 and 120 are separated.

Airborne platform 910 may be part of an aerial vehicle, such as an airplane, an aircraft carrier, a drone, or at least one satellite. When airborne platform 910 includes the wings of an airplane, transmitters 110 and 120 may be on respective tips of the wings.

Placing mutually-coherent down-looking optical transmitters on the wingtips of an airplane (or on parallel flying tethered satellites) that simultaneously illuminate the same footprint 904 on the ground while repetitively cycling through the time-shifted BPSK SAA-codes allows a novel bistatic SAL operation for true 3-D range-angle-azimuth imaging. This is in contrast to the simple height finding possible with phase-unwrapped interferometric SAR systems currently deployed for topographic mapping. Previous attempts at SAL were thwarted by the extreme Doppler and phase sensitive due to the optical wavelength scale of heterodyne detection which requires unachievable micron-scale aircraft platform stability and calibration. In contrast, embodiments of the PN-interferometry system can dial in a desired synthetic RF wavelength and bistatic phase sensitivity by the carrier frequency offset of the two lasers. Combined with the speckle tolerance of the PN-interferometric receiver, this makes the PN-interferometry approach to 3-D SAL practical for the first time, and will be investigated through analysis and simulation.

In an application scenario, transmitters 110 and 120 at respective positions ($x_0$±D, $v_a$t, h) emit BPSK SAA-coded signals (waves 914, 924) at slightly shifted carrier frequencies $\omega_1$ and $\omega_2$, with apodized emission profiles $g(x_0, y_0)$, tilted by ±sin α=D/h to produce overlapping beams on terrestrial surface 902. The emitted waveforms are given by $$a_1(x_0, y_0, z_0, t) =$$

$$\left[\delta(x_0 - D)\delta(y_0 - v_a t) ** g(x_0, y_0)e^{i\frac{\omega_1}{c}ax_0}\right]e^{i\omega_1 t}p(t)\delta(z_0 - h)$$

$$a_2(x_0, y_0, z_0, t) =$$

$$\left[\delta(x_0 + D)\delta(y_0 - v_a t) ** g(x_0, y_0)e^{i\frac{\omega_2}{c}ax_0}\right]e^{i\omega_2 t}p(t - n_0\tau)\delta(z_0 - h)$$

where p(t) is the BPSK SAA code with bit time $\tau$ and transmitter 120 is delayed by $n_0$ bits of the maximal length sequence of length $M=2^N-1$, where $n_0$ is chosen to maximize the shift intervals of the resulting shifted SAA code products. These propagate down to terrestrial surface 902, e.g., the ground, to illuminate overlapping ground footprints $$G(x, y) = e^{-\left[\frac{x}{W_x}\right]}e^{-\left[\frac{y-v_a t}{W_y}\right]}.$$

For a laser beam with anamorphic Gaussian apodization the ground spot sizes are $W_x=\lambda h/\pi\sigma_x$ and $W_y=\lambda h/\pi\sigma_y$ while for a uniform rectangular emission antenna the ground footprints would be $$G(x, y) = \text{sinc}\left[\frac{xA_x}{\lambda h}\right]\text{sinc}\left[\frac{(y - v_a t)A_y}{\lambda h}\right].$$

For a target at position (x, y, z) the ranges are given by $$R_{\pm} = \sqrt{(h - z)^2 + (x \pm D)^2 + (y - v_a t)^2} \approx h - z + \frac{D^2 \pm 2xD + x^2 + (y - v_a t)^2}{2(h - z)}$$

with a differential distance given by $$R_+ - R_- = \frac{4xD}{h - z}.$$

The total field on the ground is given by the sum of the two propagated fields $$E(x, y, z, t) =$$

$$G(x, y, t)\left[\frac{a_1}{R_-}p(t - R_-/c)e^{i\omega_1(t - R_-/c)} + \frac{a_2}{R_+}p(t - n_0\tau - R_+/c)e^{i\omega_2(t - R_+/c)}\right].$$

This field will backscatter off the rough surface of the diffuse reflective target back to receiver 130 as an interference signal 957, which is an example of interference signal 157. Receiver 130 may be on one of transmitters 110, 120, or on a third platform between, e.g., midway between, the other two of airborne platform 910, or on a low flying drone, where the two scattered speckle fields will have a matched spatial structure and interfere without any speckle mismatch. For the range to an intensity receiver at altitude H given by $$R_0 = \sqrt{(H - z)^2 + (x)^2 + (y - vt)^2} \approx H - z + \frac{x^2 + (y - vt)^2}{2(h - z)},$$

the receive signal is due to the intensity at the scattering target further delayed by $R_0/c$, which we calculate using the Back Propagation of the Local Oscillator (BPLO) principle of lidar to avoid the analytical complexity of propagating the diffuse speckled fields back to the receiver and integrating across the receiver aperture. The PN interferometric intensity projected onto the 3-D target at the ground is given by $$I(x, y, z, t) = |E(x, y, z, t)|^2 = G^2(x, y)\left[\left(\frac{a_1}{R_-}\right)^2 + \left(\frac{a_2}{R_+}\right)^2 + \right.$$

$$\left. \frac{a_1 a_2}{R_- R_+}e^{i(\omega_1 - \omega_2)t}e^{-i(\omega_1 R_- - \omega_2 R_+)/c} \times p\left(t - \frac{R_-}{c}\right)p^*\left(t - n_0\tau - \frac{R_+}{c}\right) + cc\right]$$

The interferometric cross product term contains the product of time delayed BPSK SAA codes, which results in a time shifted version of the SAA code, which is the unique property being exploited here for the first time. The term of interest is $$I = G^2(x, y)\left[\frac{a_1 a_2}{R_- R_+}e^{i(\omega_1 - \omega_2)t}\right.$$

$$e^{\frac{-i}{c}\left(\omega_1\left[h - z + \frac{D^2 - 2xD + x^2 + (y - v_a t)^2}{2(h - z)}\right] - \omega_2\left[h - z + \frac{D^2 + 2xD + x^2 + (y - v_a t)^2}{2(h - z)}\right]\right)} \times$$

$$p\left(t - \tau Q\left[n_0 - \frac{R_- - R_+}{\tau c}\right]\right) + cc\right]$$

$$= G^2(x, y)\left[\frac{a_1 a_2}{R_- R_+}e^{i(\omega_1 - \omega_2)t}e^{\frac{-i}{c}[h - z + D^2 + x^2 + y^2](\omega_1 - \omega_2)}e^{\frac{-i}{2ch}(y - v_a t)^2(\omega_1 - \omega_2)}\right.$$

$$e^{i(\omega_1 + \omega_2)\frac{xD}{ch}} \times p\left(t - \tau Q\left[n_0 - \frac{R_- - R_+}{\tau c}\right]\right) + cc\right]$$

$$= G^2(x, y)\left[\frac{a_1 a_2}{R_- R_+}\cos\left[(\omega_1 - \omega_2)t + (y - v_a t)^2(\omega_1 - \omega_2)/2ch + \right.\right.$$

$$\left.\left.(\omega_1 + \omega_2)xD/ch\right] \times p\left(t - \tau Q\left[n_0 - \frac{R_- - R_+}{\tau c}\right]\right)\right]$$

The shift-and-multiply property of the SAA codes transforms the interferometric product of the SAA codes time delayed by n chips into a shifted version of the SAA code with a shift given by the function Q[n]. The time varying signal detected due to a target at position (x, y, z) at the receive satellite with receiver aperture area $A_0$ is $$I(t) =$$

$$A_0/4\pi R_0^2 G^2(x, y)a_1 a_2/R_- R_+\cos\left[(\omega_1 - \omega_2)t + (y - v_a t)^2\omega_1 - \omega_2/c2h + \right.$$

$$\left.(\omega_1 + \omega_2)xD/ch\right]p\left(t - \tau Q[n_0 - R_- - R_+/\tau c]\right) * \delta(t - R_0/c)$$

A field of diffuse backscatterers with amplitude reflectivities $\sigma(x, y, z)$ each produce an overlapping return waveform that can be summed over to get the complete incoherently detected return power which can be correlated against the SAA code yielding a long raster signal s(t):

$$s(t) =$$

$$\int\int\int dx dy dz \frac{A_0}{4\pi R_0^2}G^2(x, y)\frac{a_1 a_2}{R_- R_+} \times \cos\left[(\omega_1 - \omega_2)t + (y - v_a t)^2\frac{\omega_1 - \omega_1}{2ch} + \right.$$

$$\left.\frac{(\omega_1 + \omega_2)xD}{ch}\right] \times \Lambda\left[B\left(t - \frac{R_0}{c} - \tau Q\left[n_0 - \frac{R_- - R_+}{\tau c}\right]\right)\right]$$

Figure 10:
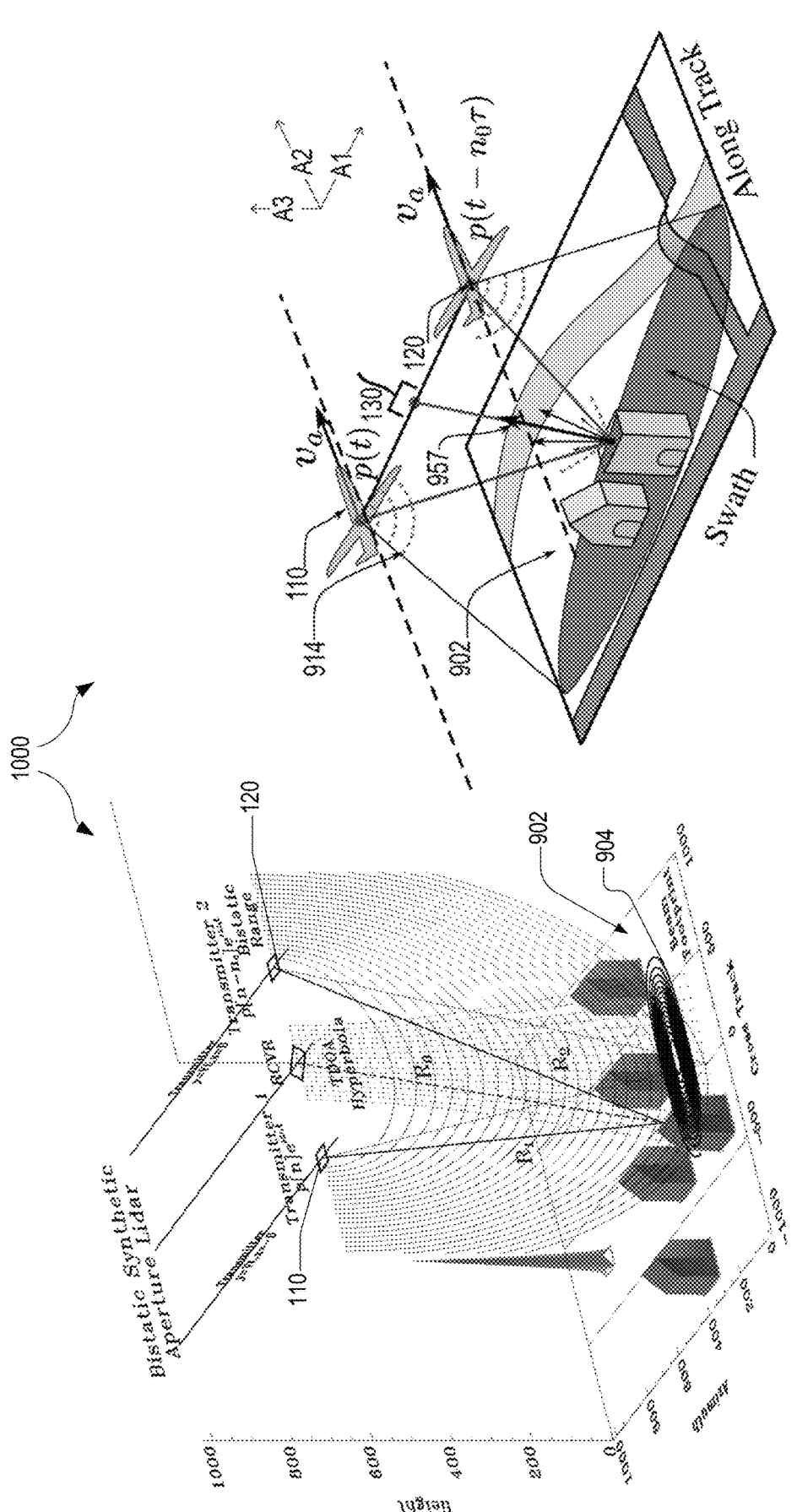
FIG. 10 illustrates geometry of a PN interferometric true 3-D Synthetic Aperture Radar (SAR) for space based remote sensing of the ground, in embodiments.

This can be rastered back into a 2-D complex image with rows of length $M\tau$, and then individual segments of this 2-D data set shifted by $Q[n_0 \pm K]$ are processed separately, each corresponding to a TDOA coordinate, with small shifts within each discontinuous TDOA segment indicating differential range delays, and range-dependent quadratic phase factors used for along-track focusing, thereby enabling 3-D imaging. Such a scenario with six point-scatterers after SAA-code correlation and 2-D raster encoding is indicated in FIG. 10. FIG. 10 illustrates two schematics of interferometric true 3-D Synthetic Aperture Radar (SAR) 1000 for space based remote sensing of terrestrial surface 902.

A large receive aperture can be used to increase the radiometric efficiency of the detected signal, because the matched speckle from both beams avoids speckle loss of typical heterodyne receivers. Circulant correlation against the SAA code turns the time-shifted SAA-code $p(t-m\tau)$ into a delta function $\delta(t-m\tau) \approx \Lambda(B(t-m\tau))$. This system provides range resolution due to the total time delay giving iso-range elliptical contours $R_\pm + R_0$, while angular resolution in the x-z plane is given by the time difference of arrival (TDOA) with orthogonal curvilinear coordinates with constant $R_- - R_+$. And the third dimension of imaging is provided by the quadratic phase along y and the synthetic aperture imaging principle. This process is complicated by the segments of the output correlation being shifted around by the Galois field function $Q[\ ]$. With each repetition of the SAA code an additional correlation peak is generated, modulated by the complex envelope containing the Doppler phase history, as is illustrated in FIG. 11 for six different targets at different heights that can be Doppler processed with an appropriate height (z) dependent quadratic impulse response.

Figure 11:
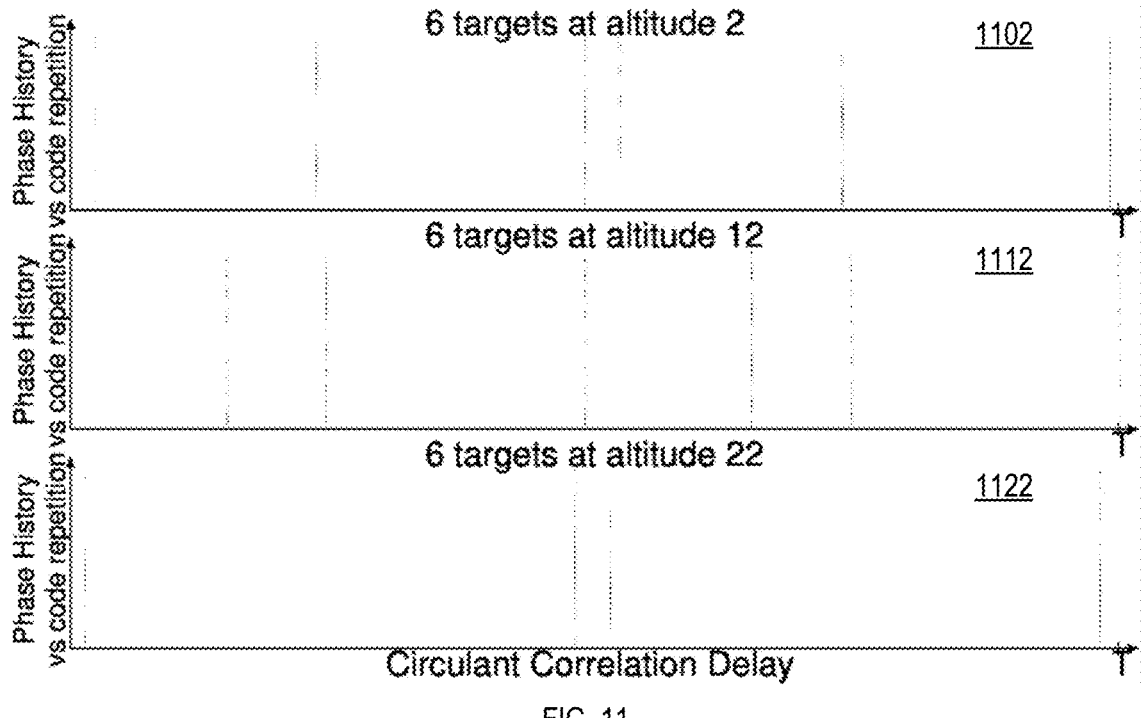
FIG. 11 shows example phase histories for six targets on the ground after SAA-code correlation of the returns for three different target altitudes, as determined by the 3D SAR of FIG. 10.

FIG. 11 shows example phase histories 1102, 1112, and 1122. for six targets on the ground after SAA-code correlation of the returns for three different target altitudes, showing small shifts of the correlation peaks (and slight change of the quadratic phase curvatures, which would be negligible in a space-based scenario). The targets at different (x,y) positions after PN-interferometric detection and circulant cross-correlation against the reference code giving narrow correlation peaks, where the phase history as the moving platforms traverse over the targets are indicated by a quadratic variation of the phase. When the z heights of the targets are incremented slightly, each of the correlation peaks shifts slightly due to the extra delay, but the time difference (TDOA) doesn't change noticeably so the peaks don't move to a Galois field shifted coordinate, and just move within the unambiguous range window. Imaging is finished by correlating each quadratic phase history against the appropriate phase reference, and assigning each regime of range delays to the appropriate hyperbolic iso-TDOA bin.

This system thus provides true complete 3-D synthetic aperture imaging, in contrast to the 2.5D height fields produced previously by phase unwrapping interferometric synthetic aperture radar interferograms.

In embodiments, the interferometric product between the BPSK PN codes produces a large-scale SAA time shift of the resulting detected PN code for each TDOA at the receiver. The segments of the correlation function contain the bistatic range delay correlation peaks. In addition, there is an additional range dependent quadratic phase factor modulation of a sequence of corresponding circulant correlation peaks with the same delay. Stacking up these correlation peaks from a sequence of repetitions of the transmitted PN codes displays a range dependent quadratic phase factor for each different peak known as an azimuthal phase history. Correlating each azimuthal phase history against the appropriate quadratic phase factor produces synthetic aperture focusing in the along-track dimension, thereby providing true 3-dimensional synthetic aperture lidar imaging of the ground

7. PN Interferometry Summary

We have presented a novel application of the interference between Binary Phase Shift keyed (BPSK) modulated PseudoNoise (PN) codes that allows a time-difference-of-arrival (TDOA) measurement through the multiply-and-shift (or shift-and-add) property of maximal length PN-sequences generated by Linear Feedback Shift Registers (LFSR). This allows a pair of mutually coherent synchronized and time shifted BPSK SAA-code transmitters to measure both bistatic range and TDOA thereby determining orthogonal curvilinear coordinates simultaneously for all illuminated scatterers, and generate 2-D images without a beam scanner or large antenna array or filled aperture. This technique will have applicability to both wideband bistatic lidar imaging systems as well as broadband bistatic mm-waves, say at 70 GHz for autonomous vehicles, or 300 GHz for THz imaging, or for underwater sonar imaging at sub-Mhz sound frequencies or ultrasonic frequencies for medical ultrasound imaging. By placing the two BPSK SAA-code transmitters on the parallel wingtips of an aircraft or on parallel-flying tethered satellites a third imaging dimension can be generated by the measured quadratic phase factors and the synthetic aperture principle. Previous Synthetic Aperture Lidar (SAL) systems had impractical optical wavelength scale phase sensitivity, but this bistatic SAL interferometry system has a controlled phase sensitivity by offsetting the frequencies of the two transmitters and introducing a synthetic RF wavelength (on the order of a few GHz) sufficiently to achieve adequate imaging resolution in the along-track dimension, which will make this bistatic SAL 3-D imaging system practical for the first time.

Figure 12:
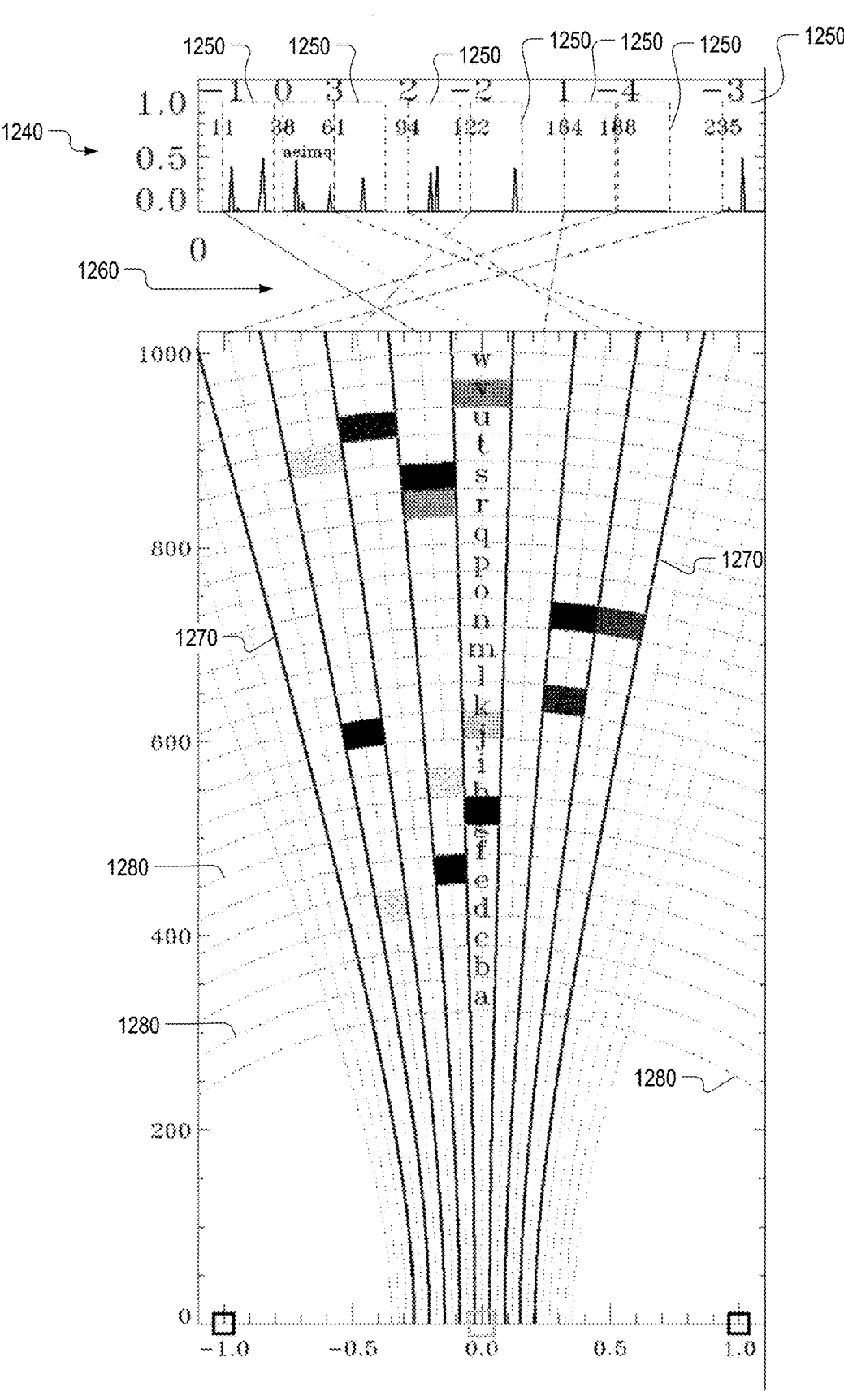
FIG. 12 depicts a plurality of well-separated shifted SAA-code product correlation peaks, each surrounded by a respective ranging window, which enables 2-D imaging according to embodiments disclosed herein.

FIG. 12 depicts a plurality of well-separated shifted SAA-code product correlation peaks 1240, each surrounded by a respective ranging window 1250, which enables 2-D imaging according to embodiments disclosed herein. In the illustrative example of FIG. 12, the code is short, $M=2^8-1=255$, whereas in practice the length of transmitted codes herein, such as codes 112 and 122 are significantly longer, e.g., $M=2^{20}-1$. Each correlation peak 1240 is an example of correlation peak 440, and corresponds to a respective time-difference-of-arrival, resulting from the shift-and-add property, and an additional small delay due to the bistatic range to $(R_1+R_2)/2+R_0$.

FIG. 12 also depicts a plurality of hyperbolic contours 1270, where for a given contour, points on the contour correspond to values of $R^1$ and $R_2$ that yield the same respective time-difference-of-arrival value, and a plurality of elliptical contours 1280, where for a given contour, points on the contour correspond to values of $R_1$ and $R_2$ that yield the same value of $(R_1+R_2)/c$, which is an average of the transit times of each SAA-code 112 and 122 from its source to scatterer 150. 130. Lines 1260 illustrate a mapping of each correlation peak 1240 to respective curvilinear pixels with an angular range bounded by two adjacent hyperbolae 1270. For clarity of illustration, not all contours 1270 and 1280 are labeled in FIG. 12.

FIG. 13 is a flowchart illustrating an interferometric imaging method 1300. In some implementations, one or more process blocks of FIG. 13 may be performed by interferometric TDOA imager 800. In embodiments, method 1300 is implemented by processor 802 executing computer-readable instructions of software 840. Method 1300 includes steps 1310, 1320, 1330, 1340, and 1350.

Step 1310 includes simultaneously illuminating a scene with: a first diverging wave and a second diverging wave. The first diverging wave originates from a first source location and modulated with a first shift-and-add qualifying-code (first SAA-code). The scene includes a scatterer that scatters the first diverging wave as a first expanding speckle field propagating from the scatterer toward a receiver. The second diverging wave originates from a second source location and is modulated with a second SAA-code. The second source location is displaced from the first source location in a first displacement direction. The scatterer scatters the second diverging wave as a second expanding speckle field propagating from the scatterer toward the receiver.

In an example of step 1310, transmitters 110 and 120 illuminate scene 802 with diverging waves 114 and 124 respectively. Rough-surface scatterer 150 scatters diverging waves 114 and 124 as expanding speckle fields 151 and 155 respectively, part of which propagates toward receiver 130.

Step 1320 includes detecting, at the receiver, an interference signal produced from spatially-integrated interference between the first expanding speckle field and the second expanding speckle field. The interference signal yields, or includes, a code temporally shifted with respect to the first SAA-code by a large-scale time-shift determined at least in part by (i) shift-and-add properties of the first and second SAA-codes, and (ii) a time-difference-of-arrival at the receiver proportional to $(R_1-R_2)/c$, where $R_1$ and $R_2$ are distances between (i) the scatterer and the first source location, and (ii) the scatterer and the second source location, respectively. In an example of step 1320, detector 130 detects at least one interference signal 157, examples of which are illustrated as interference signals 730, FIG. 7.

Step 1330 includes circulantly correlating the interference signal with a reference SAA-code to generate a correlation signal that includes a plurality of non-overlapping segments each associated with a respective one of a plurality of angularly-resolved bins as determined by the time difference of arrival. In an example of step 1330, correlator 842 circulantly correlates interference signal 857 with reference SAA-code 832. Examples of the non-overlapping segments include the segments of correlation signal associated with each separation window 524, FIG. 5.

Step 1340 determining the time-difference-of-arrival from the large-scale time-shift. In an example of step 1340, time-difference determiner 844 determines TDOA 854 at least in part from large-scale time shift 864. In embodiments, determiner 844 determines TDOA 854 at least in part from large-scale time shift 864 and look-up table 857.

Step 1350 includes determining a location of the scatterer. Step 1350 includes steps 1352 and 1356. Step 1352 includes determining, from the time-difference-of-arrival, a hyperbolic contour that locates the scatterer angularly with respect to a depth direction perpendicular to the first displacement direction, where $(R_1-R_2)/2c$ is constant for each point on the hyperbolic contour and denotes an angular coordinate. In an example of step 1350, locator 846 determines ones of hyperbolic contours 1270 of FIG. 12 from TDOA 854.

Step 1356 includes determining, from one of (i) a small-scale time-shift of a correlation peak of the correlation signal and (ii) a ranging delay, an elliptical contour that locates a range of the scatterer with respect to the receiver, where $(R_1+R_2)/2c$ is constant for each point on the elliptical contour and denotes a bistatic range coordinate. In an example of step 1350, locator 846 determines one of elliptical contours 1280 of FIG. 12 from at least one of TDOA 854 and shifted segments 866. The location of the scatterer is the intersection the determined hyperbolic contour and the determined elliptical contour.

Method 1300 may include additional implementations, such as any single implementation or any combination of implementations described below and/or in connection with one or more other processes described elsewhere herein.

In embodiments, the scene includes an additional point scatterer. In such embodiment, the interference signal includes an additional SAA code temporally shifted with respect to the first SAA-code by a large-scale time-shift magnitude determined at least in part by (i) the first shift-and-add properties of the first and second SAA-codes, and (ii) an additional time-difference-of-arrival at the receiver equal to $(R'_1-R'_2)/c$, where $R'_1$ and $R'_2$ are distances between (i) the additional point scatterer and the first source location, and (ii) the additional point scatterer and the second source location, respectively.

In such embodiments, method 1300 includes executing step 1340 to determine the additional time-difference-of-arrival. The method also includes executing step 1350 to determine an additional hyperbolic contour, where $(R_1-R_2)/2c$ is constant, and an additional elliptical contour, where $(R_1+R_2)/c$ is constant.

In embodiments, the second SAA-code is equal to the first SAA-code with a temporal offset. In such embodiments, method 1300 may include determining the temporal offset such that the correlation signal includes the plurality of non-overlapping segments. For example, software 840 determines SAA-code 822 as SAA-code 812 with a temporal offset. Determining the temporal offset may include comprising executing a random search of a correlation surface generated by a correlating the interference signal with the reference SAA-code for at least one trial range of temporal offsets. For example, software 840 executes a search, such as a random search, of correlation surface 430, FIG. 4 by correlating interference signal 157, represented as [p[n]p*[n−q]] in FIG. 4, with reference signal 832, represented as p[n] in FIG. 4. (In this example reference signal 832 and SAA-code 812 are identical.) In FIG. 4, a range of temporal offsets is a sequence of consecutive values of relative shift q, where the length of the sequence is determined by the number of desired angular range bins. In the example of FIG. 4, the sequence length is eight.

In embodiments, the search process includes "sliding" small TDOA window 432 vertically through correlation surface 430, determining a spacing of the correlation peaks for each range of q values, e.g., q=1-8, q=2-9, . . . , q=248-255, and choosing the range that yields the most evenly spaced correlation peaks.

In embodiments, at least one of the first SAA-code and the second SAA-code is one of a maximal-length pseudo-noise codes a preferred pseudo-noise sequence pair that produces a set of Gold codes with minimized cross-correlations. In embodiments, the first SAA-code is a maximal length pseudonoise sequence and, in the step of correlating, the reference signal being one of (i) the first SAA-code, (ii) the second SAA-code, (iii) a SAA code that is circulant delay offset of either the first SAA-code or the second SAA-code, and (iv) any combination thereof.

In embodiments, the first SAA-code is a maximal length pseudonoise sequence, the second SAA-code is a preferred pseudo-noise sequence pair that produces a set of Gold codes with minimized cross-correlations, and the reference SAA-code is a bank of reference Gold codes each being a product of a first input SAA code and a second input SAA code time-shifted relative thereto to produce different Gold codes as different interferometric products for different TDOAs, In such embodiments, step 1330 may include generating the correlation signal at least in part by correlating the interference signal against the bank of Gold reference codes to produce multiple correlation outputs.

In embodiments, at least one of (a) the first diverging wave and the second diverging wave have a same carrier frequency, (b) the ranging delay is equal to $(R_1+R_2+2R_0)/c$, where $R_0$ is the distance between the rough-surface point scatterer and the receiver, and (c) each of the first and second SAA-codes being modulated onto the first and second diverging waves respectively via a binary-phase-shift-key scheme. In embodiments, respective carrier frequencies of the first diverging wave and the second diverging wave differ, for example, as described in method 1400.

The ranging delay being equal to $(R_1+R_2+2R_0)/2c$, results in a small-scale time shift of the correlation peak around the large-scale time-shift. This is a consequence of the shift-and-add property of the SAA-codes modulated upon illumination, produced by transmitters 110 and 120, that is incident on scatterer 150.

In embodiments, method 1300 is implemented with a third transmitter and a second detector, such as transmitter 820 and detector 830, FIG. 8. In such embodiments, step 1310 includes illuminating the scene with a third diverging wave originating from a third source location, modulated with a third SAA-code with a shift-and-add property. The first and third diverging waves may be mutually coherent. The third source location is displaced from each of the first source location in a second displacement direction that differing from the first displacement direction. The scatterer scatters the third diverging wave as a third expanding speckle field propagating from the scatterer toward an additional receiver. The second displacement direction may be perpendicular to the first displacement direction.

Such embodiments also include repeating step 1320 where transmitter 820 and detector 830, FIG. 8, replace transmitter 120 and detector 130 respectively. This example of step 1320 includes detecting, at the additional receiver, a second interference signal produced from spatially-integrated interference between the first expanding speckle field and the third expanding speckle field. The second interference signal yields a second code temporally shifted with respect to the first SAA-code by a second large-scale time-shift determined at least in part by (i) the shift-and-add properties of the first and third SAA-codes, and (ii) a second time-difference-of-arrival at the receiver equal to $(R_1-R_3)/c$. $R_1$ and $R_3$ are distances between (i) the scatterer and the first source location, and (ii) the scatterer and the third source location, respectively.

Such embodiments also include applying step 1330 to the second interference signal. This example of 1330 includes, circulantly correlating the second interference signal with a second reference SAA-code to generate a second correlation signal that includes a second plurality of non-overlapping segments each associated with a respective one of a second plurality of angularly-resolved bins as determined by the second time-difference-of-arrival.

Such embodiments also include applying step 1340, where the second large-scale time-shift replaces the large-scale time-shift. This example of step 1340 includes determining the second time-difference-of-arrival from the second large-scale time-shift.

Such embodiments also include applying step 1350 to determine a second location of the scatterer, e.g., in along direction A2 in FIG. 8. This example of step 1350 includes determining the second location of the scatterer by determining, from the second time-difference-of-arrival, a second hyperbolic contour that locates the scatterer angularly with respect to a second depth direction perpendicular to the second displacement direction, $(R_1-R_3)/c$ being constant for each point on the second hyperbolic contour and denoting a second angular coordinate, and determining, from one of (i) a small-scale time-shift of a correlation peak of the second correlation signal and (ii) a second ranging delay, a second elliptical contour that locates a range of the scatterer with respect to the receiver, $(R_1+R_3)/2c$ being constant for each point on the second elliptical contour and denoting a bistatic range coordinate, the second location of the scatterer being the intersection the second hyperbolic contour and the second elliptical contour.

FIG. 14 is a flowchart illustrating a bistatic synthetic-aperture lidar method 1400. In some implementations method 1400 may be executed by lidar transceiver 900, FIG. 9. In embodiments, method 1400 is implemented by processor 802 executing computer-readable instructions of software 840. Method 1300 includes steps 1410, 1420, 1430, and 1440. In embodiments, method 1400 also includes at least one of steps 1450 and 1460. Method 1400 is an example of method 1300 when the first diverging wave and the second diverging wave have a different carrier frequency.

Step 1410 includes illuminating a common footprint on a terrestrial surface located beneath an airborne object moving at a velocity V in a flightpath direction by simultaneously: transmitting $A_1$ instances of a first shift-and-add qualifying-code (first SAA-code), modulated on a first carrier signal, from first transmitter located on an airborne object; and transmitting $A_1$ instances of a second SAA-code from a second transmitter located on the airborne object and displaced from the first transmitter in a displacement direction that is substantially perpendicular to the flightpath direction. In embodiments, substantially perpendicular means within ten degrees of perpendicular.

The second SAA-code is a time-delayed version of the first SAA-code, and modulated on a second carrier signal that is frequency shifted from the first carrier signal. For example, transmitters 110 and 120 simultaneously illuminate a common footprint 904 on terrestrial surface 902 located beneath airborne platform 910 moving at a velocity V in a flightpath direction A2.

Step 1420 includes detecting, on an intensity detector, backscatter from a plurality of S resolvable scatterers illuminated on the terrestrial surface on to produce a detector signal that includes interferometric beats. For example, the detector 130 detects backscatter from a plurality of S resolvable scatterers illuminated on terrestrial surface 902 to produce interference signal 957, which includes interferometric beats between the first and the second SAA-code.

Step 1430 includes, for each of the $A_1$ instances, generating a respective M-element correlation signal C(k), k=1, 2, . . . , $A_1$, by repetitively circulantly correlating the detector signal against a reference SAA-code of length $(M=2^N-1)$. The correlation signal C(k) includes (i) P non-overlapping permuted Q-element segments each encoding a respective one of P time-differences-of-arrival indexed by an angle-of-arrival index $p(k){\le}P$ and Q bistatic range delays indexed by a range index $q(k){\le}Q$ and (ii) S correlation peaks. In an example of step 1430, correlator 842 circulantly correlates interference signal 957 with reference SAA-code 832.

Step 1440 includes for each of the S scatterers: generating an along-track phase history by stacking correlation signals $C(1-A_1)$ into an array of $A_1$ rows and M columns, each of the S correlation peaks displaying quadratic phase variations along the $A_1$ rows that depends on its indices q(k) and p(k). Step 1440 also includes, for each of the S scatterers, generating an azimuthal impulse-response by correlating the along-track phase history with an expected quadratic phase history, which yields the along-track location of the scatterer, thereby providing full 3D localization. In an example of step 1440, software 840 generates at least one of phase histories 1102, 1112, and 1122.

Step 1450 includes adjusting a frequency offset between the first and second transmitters to generate sufficient phase modulation for synthetic aperture imaging and allow Nyquist sampling of the along-track phase history by the repetitive transmission of the first and second SAA-codes along the flightpath direction with time sampling $M\tau$ and spatial sampling $VM\tau$, where $\tau$ is the chip length of the first SAA-code. In an example of step 1440, data processor 801 adjusts a frequency offset between transmitters 110 and 120.

In embodiments, each of the P non-overlapping permuted Q-element segments are permuted and shifted according the shift-and-add property of the first SAA-code. In such embodiments, method 1400 may include step 1460. Step 1460 includes undoing the permutations and shifts of the plurality of segments along the M dimension of the M×A array, which allows the stacking up of a 3-D data cube of size P (angular bins)×Q (range bins)×$A_1$ (azimuth bins) as processed from $A_1$ transmittances the first and second SAA-code as the airborne object traverses a synthetic aperture of effective length $A_1M\tau$.

In embodiments, lidar transceiver 900 executes method 1400 continuously as the airborne object flies above an illuminated footprint on the ground of size $Y=A_1M\tau$ in which the quadratic phase histories of length $A_1$ are correlated against the arbitrarily long stack of PN-code correlations each of length and repetition M to produce a continuous strip map of the illuminated swath of FIG. 10 on terrestrial surface 902 as an aerial vehicle that includes airborne platform 910 flies over it.

Changes may be made in the above methods and systems without departing from the scope of the present embodiments. It should thus be noted that the matter contained in the above description or shown in the accompanying drawings should be interpreted as illustrative and not in a limiting sense. Herein, and unless otherwise indicated the phrase "in embodiments" is equivalent to the phrase "in certain embodiments," and does not refer to all embodiments. The following claims are intended to cover all generic and specific features described herein, as well as all statements of the scope of the present method and system, which, as a matter of language, might be said to fall therebetween.

What is claimed is:

1. An interferometric imaging method comprising:
simultaneously illuminating a scene with:
(i) a first diverging wave originating from a first source location and modulated with a first shift-and-add qualifying-code (first SAA-code), the scene including a scatterer that scatters the first diverging wave as a first expanding speckle field propagating from the scatterer toward a receiver, and
(ii) a second diverging wave originating from a second source location, modulated with a second SAA-code, the second source location being displaced from the first source location in a first displacement direction, the scatterer scattering the second diverging wave as a second expanding speckle field propagating from the scatterer toward the receiver;

detecting, at the receiver, an interference signal produced from spatially-integrated interference between the first expanding speckle field and the second expanding speckle field, the interference signal yielding a code temporally shifted with respect to the first SAA-code by a large-scale time-shift determined at least in part by (i) shift-and-add properties of the first and second SAA-codes, and (ii) a time-difference-of-arrival at the receiver proportional to $(R_1-R_2)/c$, where $R_1$ and $R_2$ are distances between (i) the scatterer and the first source location, and (ii) the scatterer and the second source location, respectively;

circulantly correlating the interference signal with a reference SAA-code to generate a correlation signal that includes a plurality of non-overlapping segments each associated with a respective one of a plurality of angularly-resolved bins as determined by the time difference of arrival;

determining the time-difference-of-arrival from the large-scale time-shift; and determining a location of the scatterer by:
determining, from the time-difference-of-arrival, a hyperbolic contour that locates the scatterer angularly with respect to a depth direction perpendicular to the first displacement direction, $(R_1-R_2)/2c$ being constant for each point on the hyperbolic contour and denoting an angular coordinate; and determining, from one of (i) a small-scale time-shift of a correlation peak of the correlation signal and (ii) a ranging delay, an elliptical contour that locates a range of the scatterer with respect to the receiver, $(R_1+R_2)/2c$ being constant for each point on the elliptical contour and denoting a bistatic range coordinate, the location of the scatterer being the intersection of the hyperbolic contour and the elliptical contour.

2. The method of claim 1, the scene including an additional point scatterer, the interference signal including an additional SAA code temporally shifted with respect to the first SAA-code by a large-scale time-shift magnitude determined at least in part by (i) the first shift-and-add properties of the first and second SAA-codes, and (ii) an additional time-difference-of-arrival at the receiver equal to $(R'_1-R'_2)/c$, where $R'_1$ and $R'_2$ are distances between (i) the additional point scatterer and the first source location, and (ii) the additional point scatterer and the second source location, respectively; and further comprising determining the additional time-difference-of-arrival from the large-scale time-shift;

determining an additional location of the additional scatterer by:
determining, from the additional time-difference-of-arrival, an additional hyperbolic contour that locates the additional point scatterer angularly with respect to the depth direction, $(R'_1-R'_2)/2c$ being constant for each point on the additional hyperbolic contour and denoting an additional angular coordinate;

determining, from one of (i) a shift of a correlation peak of the correlation signal and (ii) a ranging delay, an additional elliptical contour that that locates an additional range of the additional scatterer with respect to the receiver, $(R'_1+R'_2)/c$ being constant for each point on the additional elliptical contour, the additional location of the additional scatterer being the intersection of the additional hyperbolic contour and the additional elliptical contour.

3. The method of claim 1, the second SAA-code being equal to the first SAA-code with a temporal offset, and further comprising determining the temporal offset such that the correlation signal includes the plurality of non-overlapping segments.

4. The method of claim 3, determining the temporal offset comprising executing a random search of a correlation surface generated by correlating the interference signal with the reference SAA for a plurality of trial ranges of temporal offsets.

5. The method of claim 1, at least one of the first SAA-code and the second SAA-code being one of maximal-length pseudo-noise codes, a preferred pseudo-noise sequence pair that produces a set of Gold codes with minimized cross-correlations.

6. The method of claim 1, the first SAA-code being a maximal length pseudonoise sequence and, in the step of correlating, the reference SAA-code being one of (i) the first SAA-code, (ii) the second SAA-code, (iii) a SAA code that is circulant delay offset of either the first SAA-code or the second SAA-code, and (iv) any combination thereof.

7. The method of claim 1, the first SAA-code being a maximal length pseudonoise sequence, the second SAA-code being a preferred pseudo-noise sequence pair that produces a set of Gold codes with minimized cross-correlations, the reference SAA-code being a bank of reference Gold codes each being a product of a first input SAA code and a second input SAA code time-shifted relative thereto to produce different Gold codes as different interferometric products for different TDOAs, said correlating comprising:

generating the correlation signal at least in part by correlating the interference signal against the bank of Gold reference codes to produce multiple correlation outputs.

8. The method of claim 1, the first diverging wave and the second diverging wave having a same carrier frequency.

9. The method of claim 1, the ranging delay being equal to $(R_1+R_2+2R_0)/c$, where $R_0$ is the distance between the scatterer and the receiver.

10. The method of claim 1, each of the first and second SAA-codes being modulated onto the first and second diverging waves respectively via a binary-phase-shift-key scheme.

11. The method of claim 1, simultaneously illuminating a scene including:

illuminating the scene with a third diverging wave originating from a third source location, modulated with a third SAA-code with a shift-and-add property, the third source location being displaced from each of the first source location in a second displacement direction differing from the first displacement direction, the scatterer scattering the third diverging wave as a third expanding speckle field propagating from the scatterer toward an additional receiver;

and further comprising:

detecting, at the additional receiver, a second interference signal produced from spatially-integrated interference between the first expanding speckle field and the third expanding speckle field, the second interference signal yielding a second code temporally shifted with respect to the first SAA-code by a second large-scale time-shift determined at least in part by (i) the shift-and-add properties of the first and third SAA-codes, and (ii) a second time-difference-of-arrival at the receiver equal to $(R_1-R_3)/c$, where $R_1$ and $R_3$ are distances between (i) the scatterer and the first source location, and (ii) the scatterer and the third source location, respectively;

correlating the second interference signal with a second reference SAA-code to generate a second correlation signal;

circulantly correlating the second interference signal with a second reference SAA-code to generate a second correlation signal that includes a second plurality of non-overlapping segments each associated with a respective one of a second plurality of angularly-resolved bins as determined by the second time-difference-of-arrival;

determining the second time-difference-of-arrival from the second large-scale time-shift;

determining a second location of the scatterer by:

determining, from the second time-difference-of-arrival, a second hyperbolic contour that locates the scatterer angularly with respect to a second depth direction perpendicular to the second displacement direction, $(R_1-R_3)/2c$ being constant for each point on the second hyperbolic contour and denoting a second angular coordinate; and determining, from one of (i) a small-scale time-shift of a correlation peak of the second correlation signal and (ii) a second ranging delay, a second elliptical contour that locates a range of the scatterer with respect to the receiver, $(R_1+R_3)/2c$ being constant for each point on the second elliptical contour and denoting a bistatic range coordinate, the second location of the scatterer being the intersection of the second hyperbolic contour and the second elliptical contour.

12. The method of claim 11, the second displacement direction being perpendicular to the first displacement direction.

13. An interferometric imager comprising:

a first transmitter configured to emit electromagnetic radiation in a first direction;

a second transmitter laterally displaced from the first transmitter in a displacement direction perpendicular to the first direction, and configured to emit electromagnetic radiation in the first direction;

a detector having an electromagnetic radiation-receiving surface facing the first direction;

a processor communicatively coupled to the detector; and a memory storing machine readable instructions that when executed by a processor, control the processor to execute the method of claim 1.

\* \* \* \* \*